(12) United States Patent
Weiss

(10) Patent No.: US 11,200,470 B2
(45) Date of Patent: Dec. 14, 2021

(54) METHOD FOR CHECKING A SURFACE OF AN OBJECT, WHICH SURFACE IS IMPRINTED AND/OR STRUCTURED IN RASTER SHAPE, AND AN OBJECT

(71) Applicant: Schreiner Group GmbH & Co. KG, Oberschleissheim (DE)

(72) Inventor: Oliver Weiss, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 0 days.

(21) Appl. No.: 16/952,374

(22) Filed: Nov. 19, 2020

(65) Prior Publication Data
US 2021/0166097 A1  Jun. 3, 2021

(30) Foreign Application Priority Data
Nov. 29, 2019 (DE) ..................... 10 2019 132 518.8

(51) Int. Cl.
| | |
|---|---|
| *G06K 15/00* | (2006.01) |
| *G06K 15/02* | (2006.01) |
| *G06T 15/00* | (2011.01) |
| *G06T 15/50* | (2011.01) |
| *G06T 7/90* | (2017.01) |

(52) U.S. Cl.
CPC ..... *G06K 15/1836* (2013.01); *G06K 15/1842* (2013.01); *G06T 7/90* (2017.01); *G06T 15/005* (2013.01); *G06T 15/50* (2013.01)

(58) Field of Classification Search
None
See application file for complete search history.

(56) References Cited

U.S. PATENT DOCUMENTS

| | | |
|---|---|---|
| 6,104,812 A | 8/2000 | Koltai et al. |
| 6,865,001 B2 | 3/2005 | Long et al. |
| (Continued) | | |

FOREIGN PATENT DOCUMENTS

| | | |
|---|---|---|
| DE | 10 2015 212 255 A1 | 1/2016 |
| WO | 01/87632 A1 | 11/2001 |

OTHER PUBLICATIONS

Alpvision, Cryptoglyph, Retrieved Dec. 5, 2019, total of 2 pages https://www.alpvision.com/cryptoglyph-covertmarking.html.

(Continued)

*Primary Examiner* — Martin Mushambo
(74) *Attorney, Agent, or Firm* — Collard & Roe, P.C.

(57) ABSTRACT

A method for checking a surface of an object, imprinted and/or structured in raster form, includes: a) using a digital image, which reproduces a replica of the surface, b) checking and/or determining a property of the surface or the replica using the digital image and/or the replica, and c) outputting a result with reference to the property. Step b) includes constructing and/or reconstructing a raster made from raster elements, using the digital image and/or the replica in which at least one raster element parameter can assume two or more, differently large size, brightness, and/or color parameter values, depending on the position of the corresponding raster element. The surface property is checked and/or determined as a function of the differently large parameter values and/or of the distribution of these differently large parameter values on the raster elements, and the result is output in Step c).

26 Claims, 20 Drawing Sheets

(56) References Cited

U.S. PATENT DOCUMENTS

| | | | | |
|---|---|---|---|---|
| 7,020,349 | B2* | 3/2006 | Brunk | G06T 1/0071 |
| | | | | 348/E17.003 |
| 8,345,315 | B2 | 1/2013 | Sagan et al. | |
| 8,905,313 | B2 | 12/2014 | Rapoport et al. | |
| 9,443,179 | B2 | 9/2016 | Meadows et al. | |
| 9,589,217 | B2 | 3/2017 | Eschbach et al. | |
| 9,594,993 | B2 | 3/2017 | Picard et al. | |
| 9,594,994 | B2 | 3/2017 | Biro et al. | |
| 10,019,627 | B2 | 7/2018 | Kutter et al. | |
| 10,560,586 | B2* | 2/2020 | Ajioka | H04N 1/2392 |
| 2003/0122855 | A1* | 7/2003 | Pattersson | G06K 9/228 |
| | | | | 345/690 |
| 2006/0170870 | A1* | 8/2006 | Kaufman | G03B 21/00 |
| | | | | 353/28 |
| 2007/0174610 | A1* | 7/2007 | Furuya | H04N 1/444 |
| | | | | 713/167 |
| 2007/0279688 | A1* | 12/2007 | Gasczyk | B41F 33/0036 |
| | | | | 358/1.16 |
| 2009/0058971 | A1* | 3/2009 | Laaspere | B41M 5/00 |
| | | | | 347/101 |

OTHER PUBLICATIONS

Product Brief—Digimarc Barcode for Fresh Product Labels, Digimarc Corporation, total of 2 pages https://www.digimarc.com/docs/defaultsource/solution-briefs/product-brief-digimarcbarcode-for-thermallabels.pdf?sfvrsn=2a62f537_12, downloaded Dec. 5, 2019.
Q-R Smartphone Authentication, Retrieved Dec. 5, 2019, total of 3 pages https://www.jura.hu/products/brandprotection/iq-r-smartphone-authentication.

* cited by examiner $K_2, (x, y)$ $K_{2, inv}(x, y)$ $V_2(x', y')$

K (x, y)

$K_{inv}$ (x, y)

METHOD FOR CHECKING A SURFACE OF AN OBJECT, WHICH SURFACE IS IMPRINTED AND/OR STRUCTURED IN RASTER SHAPE, AND AN OBJECT

CROSS REFERENCE TO RELATED APPLICATIONS

Applicant claims priority under 35 U.S.C. § 119 of German Application No. 10 2019 132 518.8 filed Nov. 29, 2019, the disclosure of which is incorporated by reference.

BACKGROUND OF THE INVENTION

1. Field of the Invention

The present invention relates to a method for checking a surface of an object, which surface is imprinted and/or structured in raster shape. The present invention furthermore relates to an object having a surface that has a printed raster or one configured in some other manner, the structure of which raster contains a coded and/or decodable security feature.

2. Description of the Related Art

Imprints on objects or their packaging are increasingly being provided with security features, using which features their authenticity or genuineness, in other words their actual origin from the manufacturer, licensee or vendor can be checked, for example by scanning or photographing the security feature (for example using a smartphone) and comparing it with a proven authentic digital template provided by the actual manufacturer or a digital template of the security feature being used.

Such graphically or visually functioning security features can be a noise pattern, for example; frequently, the security feature is structured to be recognizable as such and is accommodated, for example, in a separate surface section of the imprinted surface reserved for this purpose, partly also explicitly identified as such or framed.

SUMMARY OF THE INVENTION

The present invention, in contrast, serves for determining properties and, in particular, security features that are at least visually hidden, more or less, i.e. are not easily recognizable as such.

For example, alphanumeric inscriptions or other graphic or visual designs are produced on the surface of objects using printing techniques or other processing techniques (such as, for example, punching, embossing, laser cutting, laser inscription), in which techniques a raster composed of a plurality of raster elements (for example composed of printing ink) is applied to the surface.

A printed raster on an object can be structured, with regard to its composition of the raster dots or raster elements, in such a manner that it carries a security feature in itself, although at first glance the raster appears to reproduce merely the printed motif (for example the product name or manufacturer name). For example, the positions of the individual raster elements within the printed raster can be varied in a specific manner. Such security features and others, which can make it possible to check the authenticity or genuineness or actual origin, for example, cannot be easily reproduced by unauthorized imitators.

It is the task of the present invention to make available a method with which a surface of an object, which surface has been imprinted in raster form and/or structured or processed in raster form can be checked, in novel manner, with regard to its composition or to a specific characteristic and/or property. It is furthermore the task of the present application to make available an object having a surface imprinted or processed in raster form, in the raster of which a security feature is not only contained but also, at the same time, hidden more deeply and/or superimposed on another, more noticeable security feature.

This task is accomplished by means of the method according to one aspect of the invention and by means of the object according to another aspect of the invention.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

In this application, the respective reference symbols are used comprehensively for all the figures of the application; for an explanation of the elements to which they refer, it is therefore possible to refer to the disclosure of the other figures, in each instance. If a reference symbol mentioned in the description does not occur in a figure, reference is made to the other figures, in this regard.

Figure 1:
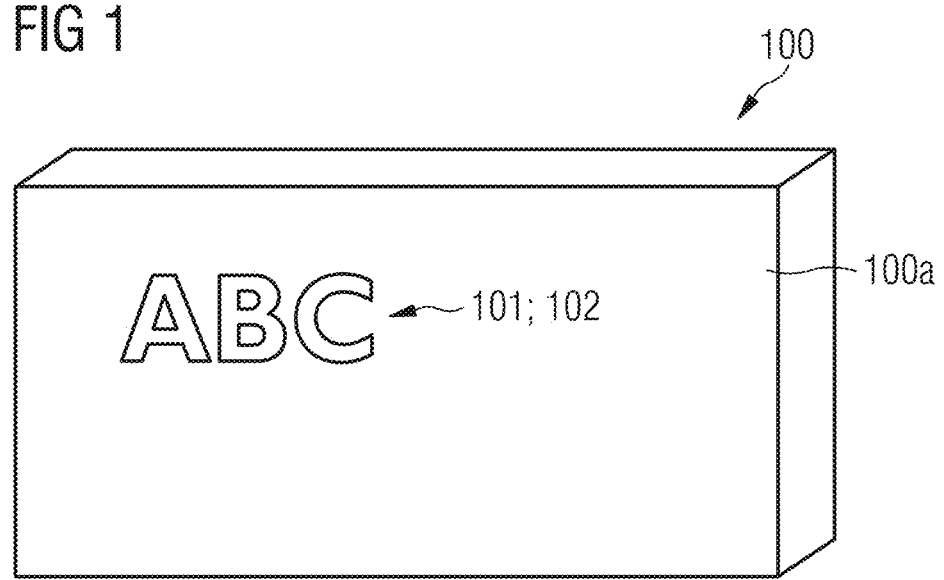
FIG. 1 shows an exemplary object having a surface that is provided with a visual structure that can be produced using printing technology or in some other way.

FIG. 1, as an example, shows an object 100 having a surface 100a, which is provided with a design in raster shape, produced using printing technology, i.e. as an imprint or in some other manner; for example, as shown, with an alphanumeric inscription "ABC" and/or in the form of an image, a logo, a photo, a graphic, a rectangle or any other desired (printed) motif. The imprinted surface regions are not imprinted continuously but rather configured as a raster composed of raster elements (for example composed of printing ink). Also, the (printed) motif can be printed in very pale manner, for example in that the surface is filled by only about 2%, so that in some cases, the motif is not even noticed with the naked eye.

The inscription, which is given only as an example here, can, at the same time, form an identification 101 of the object 100. It can, in particular, also indicate, disclose and/or document the origin of the object 100, its manufacturer or its genuineness or another forgery-relevant property of the object or a check of the object that was undertaken, at least in a form that is covered or hidden in the raster. The inscription or identification 101 can, in particular, be a security feature 102 or comprise such a feature.

Printed dots or raster dots can also be provided in apparently non-printed surface regions, for example white or transparent surface regions of an object, which dots cannot be perceived or can barely be perceived with the naked eye, for example particularly small raster dots. If such security features are provided, a corresponding digital template, i.e. a digital template file is used to produce the printed copies that are to be formed on the imprinted surface 100a of an object 100, for example on a surface 100a of a packaging, a document, a tool or machine part of a housing 100. Any desired objects or their packaging can be used for such surface designs in raster form that are imprinted or produced using other techniques, for example also labels, in particular security labels.

Figure 2:
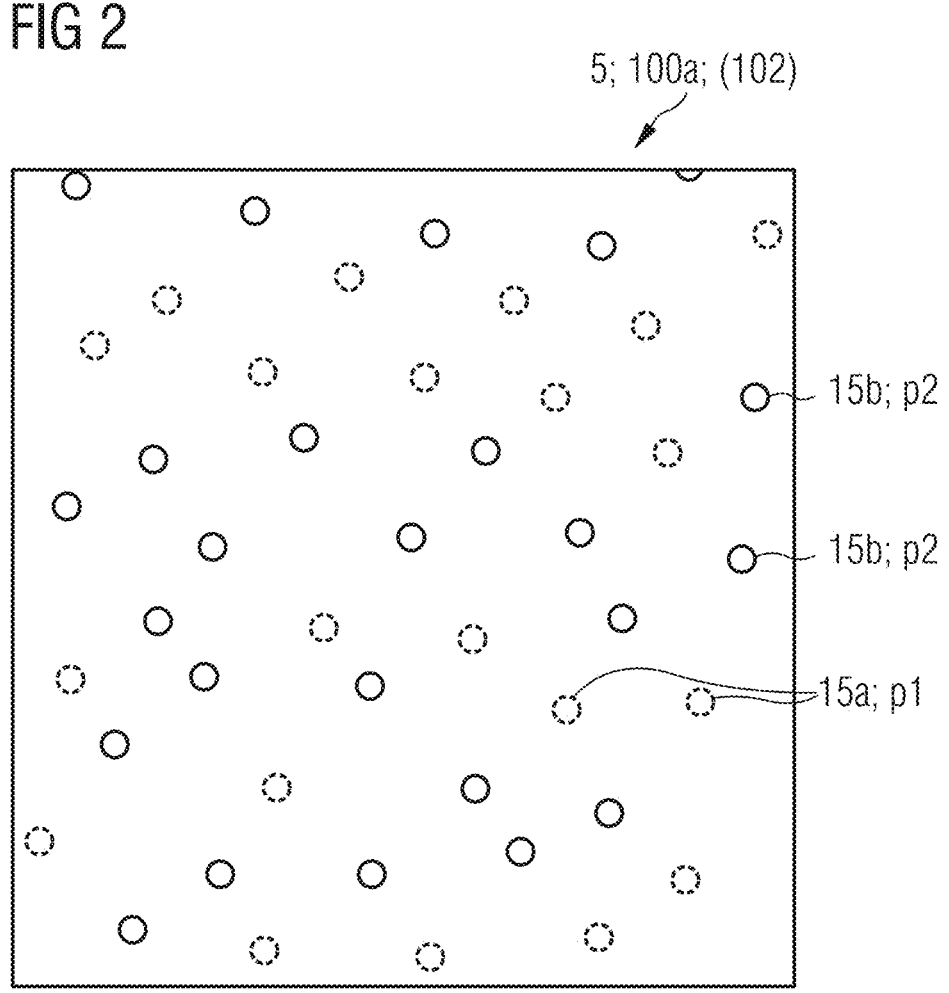
FIG. 2 is a photograph taken using a USB microscope, of a printed raster produced using an ink jet printer, with different droplet sizes on a background.

FIG. 2 shows a photograph using a USB microscope of a printed raster, produced using a 600 dpi ink jet print head having the droplet sizes 3 pl and 7 pl, respectively, on a background on which the ink jet droplets run comparatively strongly. The diameters of the printed dots typically amount to 75-80 μm and 82-88 μm, respectively.

Figure 3:
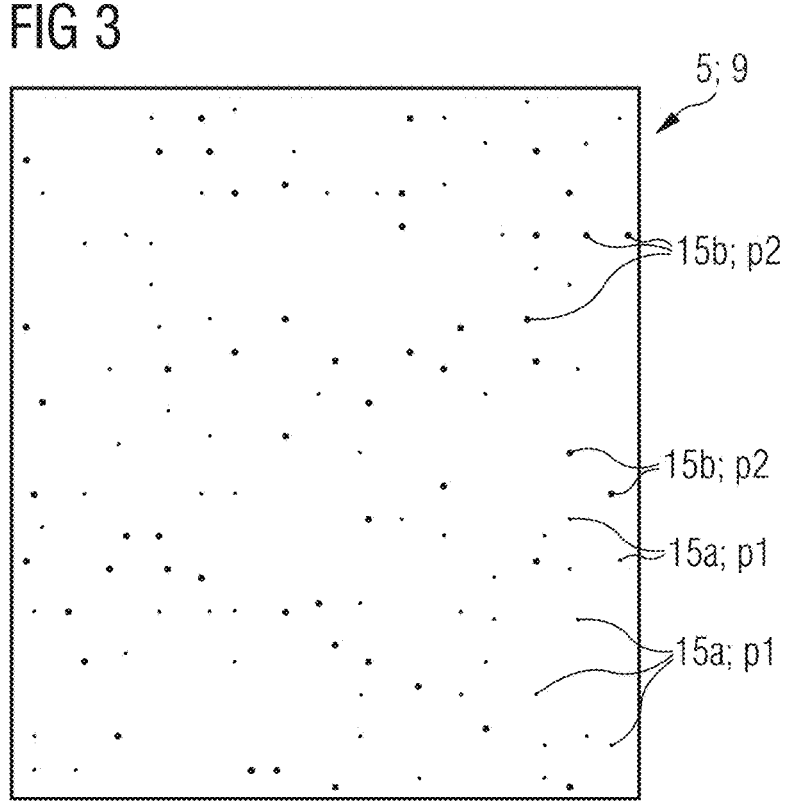
FIG. 3 shows a schematic print template for printing of a printed raster, which has raster elements of different sizes and an individually varying offset of the raster elements.

FIG. 3 shows a schematic print template for printing a printed raster, which has different sizes of raster elements and an individually varying offset of the raster elements. The raster possesses a pseudo-random distribution of the positions of the raster elements 15; these positions are individually offset relative to intersection points of a raster, and thereby slightly deviating positions of the raster elements relative to the positions of the intersection points (cf. FIG. 4; see farther below) occur.

Furthermore, the raster elements 15 occur in (at least) two different sizes and/or brightness values, for example in correspondingly different droplet sizes. Thus, in FIG. 3 a group of first raster elements 15a is smaller (and smaller and brighter in FIG. 2), whereas a group of second raster elements 15b is larger (and larger and darker in FIG. 2).

While printed patterns as in FIG. 2 are very inconspicuous for an observer if they are composed of very small printed elements, smartphones often detect such small printed dots very clearly. If such structures are printed in yellow, they can be lost in the smartphone image under lighting conditions that are not optimal. In contrast, other printing inks such as black, cyan, and magenta are better suited for such rasters of printed dots or printed spots.

Figure 4:
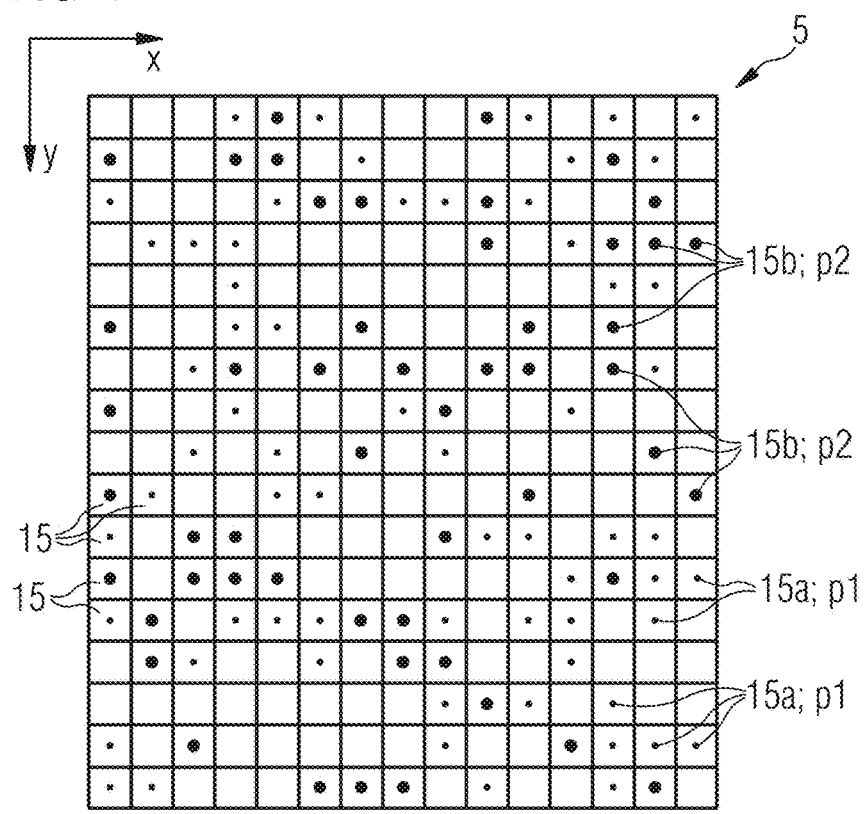
FIG. 4 shows the raster from FIG. 3, but without the individually varying offset of the raster elements and with representation of the base cells around the raster elements.

FIG. 4 shows the raster 5 (having raster elements 15a, 15b of different sizes), predefined with regard to the sizes and/or brightness values of the raster elements, in pseudo-random manner, but without the individual offset of the raster elements relative to the positions of the intersection points of the raster and with representation of the base cells around the respective raster elements 15 or intersection points. The structure of the individual offset of the raster elements that is added in FIG. 3 and will be explained below, using FIG. 6, whereby the raster elements come to lie in the center of a corresponding sub-cell or partial cell instead of in the center of the corresponding base cell B, is left out in FIG. 4, in order to first separately explain the characteristic according to which the size or optical density (gray value) of the raster elements is varied in pseudo-random manner (for the sake of clarity, the size difference is shown with great exaggeration), specifically as a function of the position of the raster elements within the overall raster 5. The different raster elements 15a, 15b are supposed to differ, when they are imprinted onto the surface 100a of the object 100, with regard to a parameter that can assume different values, in particular only two different values p1, p2, in each instance, for example one of two different values for its brightness (gray value in the photographed image itself) or for the size or the diameter of the raster element, in each instance. Fundamentally, multiple parameters of the raster elements 15a, 15b can also be varied; in the following, in FIG. 4, reference is made to the dot size or spot size. In the finished printed copy, both the brightness and the diameter can be influenced by means of the dot size of the printed raster element.

In FIG. 4, the decision regarding the size or the optical density of each printed dot was calculated, in pseudo-random manner, from the position of the base cell of the printed dot within the overall raster. This calculation can be done, for example, using a recursive arithmetical random number generator, which delivers pseudo-random numbers distributed uniformly within a number interval, for example using a "seed," i.e. a random factor, where different pseudo-random patterns can be generated by recursive arithmetical random number generators as a function of this factor.

The present application describes a method for checking a security feature, for example, which is imprinted on an object or embodied on it (and previously might have been predefined according to a digital print template as structured in FIG. 3 or 4, i.e. with a hidden security feature worked into it). The security feature (which is then also embodied on the object), as different additional information or an additional variation, which is difficult to discern, can have a different security feature, which can be discerned more easily, superimposed on it in the printed image on the object, but likewise it can also be provided in stand-alone manner, wherever a pseudo-random variation of the size and/or of the optical density of its raster elements 15 of the printed raster 5 is supposed to be implemented in any desired visual, printed motif or surface motif. The difference in the size or the optical density of the printed dots should be selected in such a manner that within the scope of checking, in particular using a smartphone, reliable statistical separation of the two printed dot variants is still possible, but the optical difference between the two printed dot variants is as slight and inconspicuous as possible.

The maximum resolution of sharp photos taken with smartphones currently lies in the range of 800-1500 dpi (depending on the smartphone model); the typical size of the printed dots suitable for this resolution is slightly greater than the size that corresponds to an image pixel at 800 dpi, in other words greater than 31.75 µm. In flexographic printing, the resolution of the printed dot sizes can often be scaled relatively freely, and, aside from offset printing or screen printing, ink jet printing at at least 600 dpi is also suitable, wherein at 600 dpi, the printed dot diameter nominally corresponds to about 42.3 µm and, on the basis of the spread that usually depends on the background, in practice it lies in the range of 45 to 90 µm.

For the printed dots, usually different droplet sizes can be used in industrial ink jet printers, so that aside from the smallest possible droplet size (e.g. 3 pl), for example, it is also possible to print using double the droplet size (e.g. 6 pl). In order for the difference in the printed image to be as inconspicuous as possible, ink jet print heads in which the second smallest droplet size is clearly smaller than twice the minimum droplet size can be used, for example where the smallest and second-smallest droplet sizes are 6 pl and 7 pl. If necessary, a background or surface material can be used (in particular for documents, labels or packaging), on which the printed image runs greatly, so that nominally large ratios between the variable printed dot diameters p1, p2 turn out to be smaller, in practice.

The variation of the size or of the other parameter of the raster elements 15 of FIGS. 2 to 4 can have other, if applicable, more easily discernable security features superimposed on it, for example a deterministic or pseudo-random distribution of the raster elements 15 over an average of only every other base cell of the raster 5, as indicated in FIG. 4. Hereinafter, in contrast, the pseudo-random variation of the size and/or optical density of the raster elements 15 of the printed raster 5 will first be explained in stand-alone manner, in particular the method for its recognition and evaluation.

This method for checking a surface 100a of an object 100, imprinted and/or structured in raster form, provides for examining, instead of the surface 100a itself, a digital image 6 produced of the surface (as shown in an excerpt in FIG. 5, for example), which image reproduces a replica A of the surface 100a of the object 100, imprinted in raster shape (finding the surface section underlaid with the security feature can take place, depending on the printed image, by means of clearly visible structures of a visually very well visible main motif, for example, at which the camera or the smartphone is directed).

The section of the surface 100a shown in the digital image 6 can comprise, in particular, an identification 101 of the object 100, in particular a security feature 102 on the object, and can replicate the region of the surface 100a that immediately surrounds it.

In the case of the method according to the invention, a raster 5 composed of raster elements 15 is constructed or reconstructed solely using the digital image 6 or the reproduced replica A—entirely without any further examination of the object 100 itself—which raster corresponds to the original raster on the object 100 or at least comes very close to it, and thereby the composition or a property (for example genuineness or authenticity) of the raster-form printed image on the object 100 can be checked in indirect manner. The reproduced raster is (re)constructed in such a manner that the variable parameter (size, brightness and/or color) of the raster elements 15 is different in size, depending on their position, and always assumes one of two parameter values p1, p2, for example. From the examination of the raster determined, finally the result with regard to the property of the printed pattern or other pattern originally incorporated on the object is determined and output, read out and/or extracted from other information in the printed image.

Photographing or creation of the digital image 6, as well as its evaluation (and ultimately also the entire method according to the application for determining the hidden information) can take place using a smartphone, for example, but also using a film or photo camera, a scanner, a webcam, a microscope (for example a USB microscope), a tablet, augmented reality glasses or using any desired other device that is provided with a camera, i.e. using any desired picture-taking device. The digital image 6 can be evaluated by the picture-taking device itself, which is used, but alternatively also by means of some other fixed or portable computer (e.g. laptop or smartwatch) or on a server on the Internet.

Figure 5:
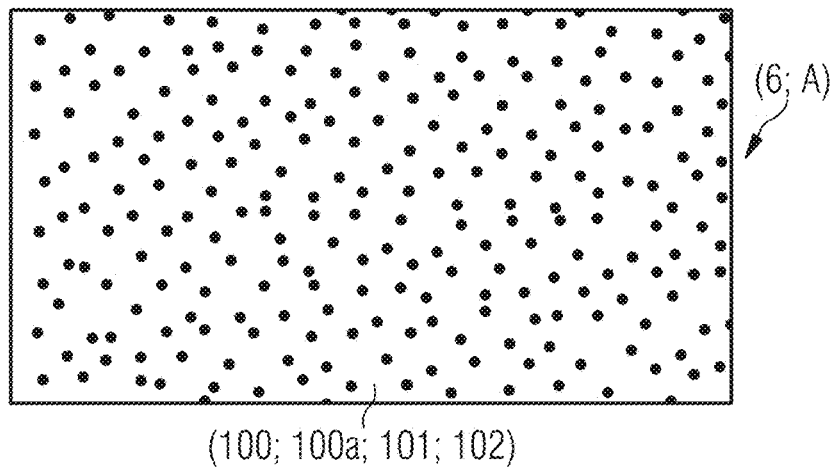
FIG. 5 is a digital image of a printed copy of the surface, taken using a smartphone.

The digital image 6 in FIG. 5, having an image resolution of 893 dpi, was taken using a smartphone. For the further description, it is assumed that a perspective correction for eliminating a possible picture tilt between the surface 100a of the object 100 and the picture-taking device has already been carried out in the digital image 6 that is used; the digital image 6 (i.e. the replica 6 of the surface 100a stored in memory as its image content) has therefore already been corrected.

Before any further processing, smoothing of the digital image 6 or of the brightness values of its image pixels B(x,y) can be advisable, for example for elimination of noise. The image values are brightness values, in the simplest case, which lie between absolute black (corresponding to the value zero) and a maximum brightness; alternatively, they can also comprise color values or brightness values for multiple colors (e.g. cyan (C), magenta (M), yellow (Y), black (K) or, as usually used, red (R), green (G), blue (B). Smoothing of the digital image 6 or of the brightness values can take place in different ways.

A simple possibility for smoothing consists in averaging the image values over a pixel range of n×n, in each instance, for example over 3×3 pixels, in other words according to the formula $$M(x,y)=1/9 * \rho_{(i=-1,0,+1, j=-1,0,+1)} B(x+i, y+j),$$

wherein M(x,y) refers to the image values calculated after this smoothing, instead of the original pixel values B(x,y).

This method of smoothing will also be used for an optional additional characteristic that will still be explained later and that is supposed to be superimposed on and to disguise the security feature proposed here, according to which the raster elements are varied in size, brightness and/or color, according to the diversion principle of "plausible deniability."

For the variation of the raster elements with regard to size, brightness and/or color being discussed here, however, the following, slightly modified method of smoothing is proposed:

$$M_2(x,y)=B(x,y)+1/9 * \Sigma_{(i=-1,0,+1, j=-1,0,+1)} B(x+i, y+j),$$

which means that the image smoothed according to M(x,y) additionally has the previous, unsmoothed image B(x,y) superimposed on it. This superimposed image takes the dot-shaped characteristic of the raster elements 15 into account and concentrates their brightness gradient more strongly onto its center point. In a general case, instead of the image $M_2(x, y)$ calculated in this manner, also B(x, y) itself or some other smoothed image function M(x, y) can be used for the further calculations, in particular for determination of the contrast.

For reconstruction using the proposed methods, security features having a low print density (less than 5%, preferably less than 2%), in particular, can also be considered; these security featues can be perceived only with difficulty and can be reproduced only with errors. Nevertheless, the methods allow at least a statistical evaluation of the digital raster replica 6 or A, and thereby original printed rasters and forged printed rasters can be differentiated.

Figure 6:
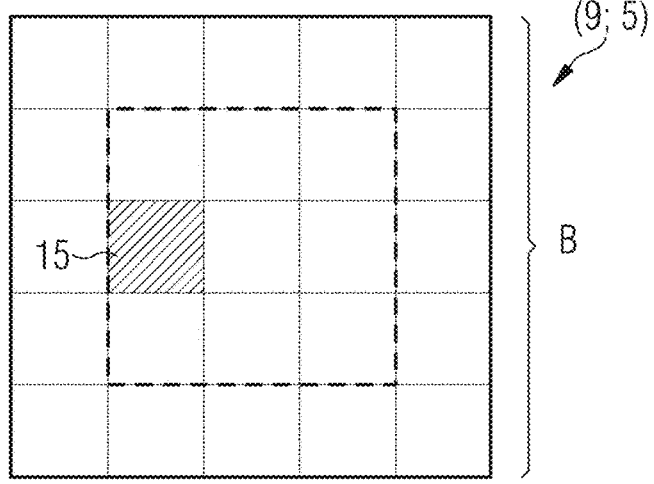
FIG. 6 is a section of the surface of a digital template corresponding to a further subdivided base cell.

For additional, optional disguise of the rasters, every base cell B of the raster can be subdivided into a matrix of n×n, for example 5×5 partial cells (=pixels) during planning of the raster 5, as shown in FIG. 6 (specifically in the surface of the digital template 9 (print template for the raster)), wherein per base cell B, only a single one of the 25 or n×n pixels has a raster element 15 (of a size, brightness and/or color still to be defined) laid onto it, and is later printed onto the object surface 100a; the average print density then amounts to 1/25=4% (and, in the case that only every second base cell is occupied by a raster element, actually only 1/50=2%).

In order to later allow reconstruction and evaluation of the raster that is to take place using the method according to the invention, when the same printed raster imprinted onto an object surface 100a is photographed from there (for example using a smartphone), it can optionally be provided that in the raster 5 (originally defined in the digital template 9 according to FIG. 6), at least precisely one and the same line and column per base cell B is never occupied by a printed dot, i.e. remains unoccupied throughout. In order to facilitate reconstruction of the raster, preferably always multiple, for example two lines and two columns per base cell B, in each instance, can remain unoccupied throughout (in FIG. 6, for example, the pixels of the uppermost and lowermost line and those pixels of the leftmost and rightmost column of the further subdivided base cell B), i.e. can remain free of raster elements in the entire raster. Therefore, if the edge-side or outermost pixels remain empty, this raster element 15 is assigned (if the corresponding base cell is supposed to be occupied by a raster element 151) to one of the inner remaining 3×3 or nine pixels, which together are outlined by the thicker broken line in FIG. 6. In FIG. 6, the raster element 15 lies, for example, on the second pixel from the left in the middle line. Because two base cells always border on one another, here actually two columns and lines that border on one another always remain free of raster elements throughout, specifically over the entire image surface of the digital template 9 (and therefore also later on the corresponding printed raster on the object), as well as in the raster 5 reconstructed from the digital photo 6 that was taken, in the reconstruction and examination method for evaluation of the photographed printed pattern.

This further subdivision of the base cells, which can be combined with all the embodiments, (or, considered vice versa: the summarization of the pixels in super-cells B composed of n×n pixels, in which at most only a single raster element is positioned, in each instance) forms the basis of the following figures, in each instance, but is nevertheless only an optional additional characteristic that serves for additional further disguising of the actual security feature, which consists in variation of the size parameters, brightness parameters and/or color parameters of the raster elements 15.

In the following, the further reconstruction of the raster of the digital image 6 taken of the object 100, from FIG. 5, will be discussed; the (optional) first step for smoothing of the digital image 6 was already explained above.

This (printed and then photographed) raster from FIG. 5 is also based on a (but actually an optional) 5×5 subdivision or pixel grouping of the original template 9 used for imprinting (i.e. with grouped cells according to FIG. 6).

Those image pixels that represent a local brightness minimum over a comparison region, which has a size of m×m pixels, of the smoothed camera image $M_2(x,y)$, can be identified as "centers" of the raster elements, for example according to the logic function $$Y(x,y)=1, \text{ if } M_2(x,y)=\text{MIN}_{(i,j=-4 \ldots +4)}(M_2(x+i, y+j))$$
and $$Y(x,y)=0 \text{ otherwise.}$$

On the basis of the resolution, in the exemplary embodiment of FIGS. 5 ff., the raster period amounts to 7.5 image pixels, as an example. The side length or running width of the comparison region of 9×9 image pixels in the formula for Y(x,y) results from a center having a typical distance from precisely one base cell (corresponding to 7.5 image pixels) in every orthogonal direction to the next adjacent centers, but the offset variation of the pixel position of a next adjacent center, used for disguising, according to FIG. 6, can lead to the result that this distance can drop by 1 sub-cell of a base cell, i.e. down to 6 image pixels and (in the case of disadvantageous offset of the center itself that is being considered) by a further sub-cell of a base cell, down to only 4.5 image pixels. If the comparison region is selected to be too small, pseudo-centers could be determined on image pixels where no printed dot even lies, due to the offset variation of the centers, within the related comparison region. If, on the other hand, the running width of the comparison region is selected to be too large, then at least some of the raster elements 15 will not be recognized as centers, because they are less dark than their neighbors. At least for the period of the raster being used as an example here, of 7.5 image pixels, the local brightness comparison over 9×9 image pixels proves to be the best compromise.

In order to prevent display of pseudo-centers, it is suitable as an optional additional requirement for the evaluation of a pixel as a center that its brightness minimum must deviate from the background brightness in the comparison region by a predetermined minimum value. For this purpose, it is true that a minimum limit value would have to be indicated, but the dimensioning of the comparison region would be less critical.

The size of the comparison region, indicated here in the form of the running widths of the indices, is dependent on the raster period and thereby also on the image resolution. The sizes of the regions indicated here and in the following hold true for an image resolution of $A_{image,reference}$=900 dpi at a raster period of 212 μm (which results from the print resolution of 600 dpi and 5 sub-cells per base cell used in this example), which corresponds to a raster period of 7.5 image pixels at the aforementioned image resolution of $A_{image,reference}$=900 dpi. At other image resolutions or raster periods, the dimensions of the comparison regions would be rescaled linearly and rounded up to the next closest odd number. For example, for an image resolution $A_{image}$=1200 dpi, the side length of the region of $A_{image}$/900 dpi*(raster period$_{900dpi}$/image pixels+1), rounded up to the next closest odd number, would be ideal, wherein "raster period$_{900dpi}$/image pixels" refers to the raster period in image pixels at an image resolution of 900 dpi. The image resolution can be estimated on the basis of the real size of surrounding printed elements and is non-critical with regard to accuracy.

Figure 7:
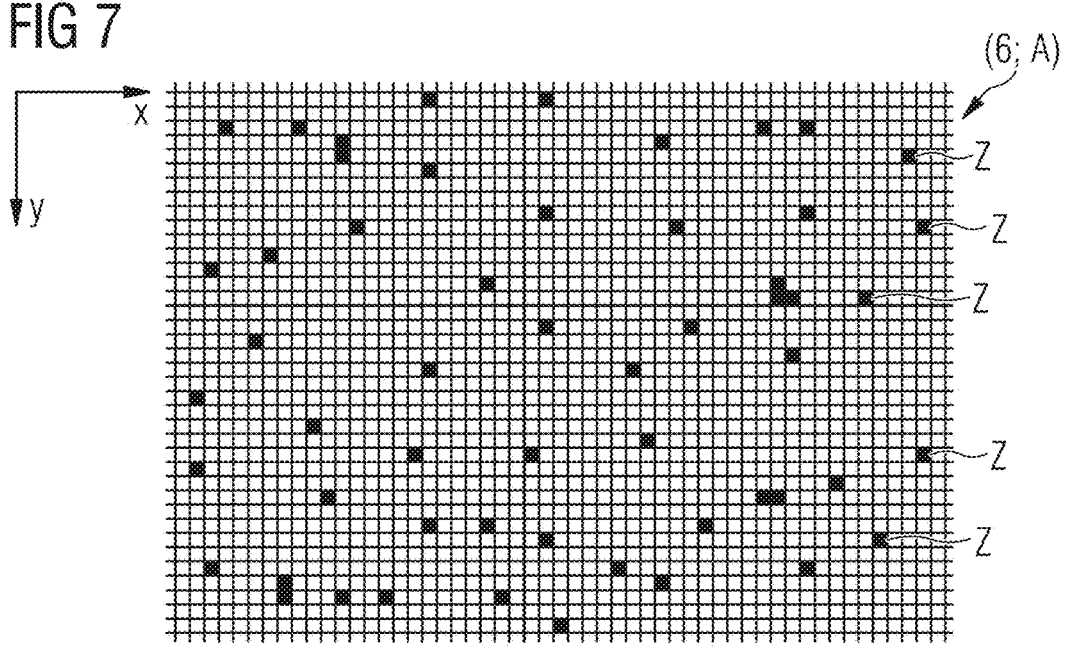
FIG. 7 is a partial section of the surface of the digital image, with determined positions of raster elements.

FIG. 7 schematically shows the positions of centers Z determined in this manner, in a cutout of the surface of the digital image 6, at which positions of raster elements were determined. At some locations, directly adjacent multiple centers can be recognized; these multiple centers come about in that two or more adjacent smoothed pixels have the identical, locally minimal brightness value. Because every raster element in the digital image always has a size of multiple image pixels, and furthermore is at a distance from all the surrounding, adjacent raster elements, however, display of directly adjacent double pixels or pixel groups should be interpreted to mean that only there, the same raster element 15 or brightness minimum lies precisely between two or more pixels. This erroneous display of multiple centers directly next to one another can be corrected in that a pseudo-random number that varies depending on the pixel position, in an almost vanishing value range, i.e. a very small value range (for example between zero and 0.000001 or between zero and maximally $10^{-n}$ with n≥6) is added to the brightness values of the pixels of the smoothed camera image M(x,y) in FIG. 5, in each instance, so that the pixel brightness can always assume a local minimum locally on only one individual pixel.

It is the goal of the method according to the invention to reconstruct the raster 5 itself from the recognized arrangement of positions of raster centers Z within the (smoothed and further processed) digital image 6, specifically in such a manner that it corresponds or comes as close as possible to the raster 5 originally used as a basis during imprinting of the object. If not the original raster or only a different raster can be determined in this manner, the method speaks about the construction (instead of reconstruction) of a raster, because an attempt is made, in every case, to determine, by means of investigation and evaluation of the digital image 6, what the raster originally used as a basis (cf. FIG. 2) must have looked like. Even if the raster that is determined or constructed proves to be an incorrect raster (which indicates, for example, that the photographed object is not an original, authentic product, and that the hidden information of the security feature has therefore been forged), the method of procedure for construction of this raster is precisely the same as for reconstruction of the actual original raster. Furthermore, even in the latter case, statistical and error-related deviations from the original raster are unavoidable, if only because reconstruction of the original raster can take place only with a specific precision.

For (re)construction of the raster being sought, the following must be determined:
  an angle of twist θ between one of the two coordinate directions of the digital image 6 and one of the two period directions of the raster itself,
  a period (also called a period length a here) along the two periodicity directions, which are orthogonal to one another (or, if the period length along the two orthogonal periodicity directions has different values depending on the raster, the values for both of these period lengths),
  the two lengths Vx, Vy for the offset or the displacement along the first and the second coordinate direction of the digital image 6, so as to displace the raster that runs through the coordinate origin, which raster is formed by the period length a and the angle of twist θ, in such a manner that it can be optimally brought into coverage with the centers, as described below.

Thereby, four parameters must be determined in such a manner that in the (re)construction of the raster, the raster originally used when imprinting the object is formed.

In the conversion of the image coordinates of all the raster elements in the coordinate system of the digital image 6 generated by the image pixels (image coordinates x and y) to the changed image coordinates of all the raster elements in the coordinate system of the raster 5 that is being sought and is to be reconstructed (raster coordinates x' and y'), the following conversion formulas apply for the image coordinates:

$$x'=1/a*((x-Vx)*\cos(\theta)-(y-Vy)*\sin(\theta))$$

$$y'=1/a*((x-Vx)*\sin(\theta)+(y-Vy)*\cos(\theta)),$$

wherein the left top corner of the digital image 6, for example, is selected as the origin, for example the left top corner of the image section shown in FIGS. 4, 5, 10 (and once again, as a detail and enlarged, in FIG. 6).

With regard to carrying out this determination of the actual (raster) parameters, it is proposed that construction and/or reconstruction of the raster 5 from the digital image 6 comprises that first an angle of twist θ of a periodicity direction of the raster 5 to be constructed and/or to be reconstructed, relative to a coordinate direction of the digital image 6, and at least the period length a of the raster 5 to be constructed and/or to be reconstructed are determined jointly, with reciprocal dependence on one another, without establishing an overall offset Vx, Vy of the raster to be constructed and/or to be reconstructed, relative to the digital image, and that using the result values determined for the angle of twist θ and for the period length a, only afterwards a lateral offset Vx, Vy is calculated, by means of which the centers can be brought into coverage with the intersections of the raster 5 in the best possible manner, and this is the prerequisite for being able to reconstruct the information 4 represented by the second partial surface region 20 from the digital image 6.

Therefore, it is proposed not to optimize or vary all four parameters θ, a, Vx, Vy at the same time during optimization, but rather to first determine only the angle of twist or raster angle θ and the raster period a, while in this regard, the offset displacements Vx, Vy, which are at first unknown but must also be determined, are estimated in suitable manner.

Furthermore, it is proposed to use a global algorithm, specifically either a deterministic global optimization algorithm or a randomized global optimization algorithm for the joint optimization of the two parameters θ, a (ignoring the further parameters Vx, Vy), which is to be undertaken first. Here, the use of an evolutionary algorithm will be mentioned as a conceivable example of a randomized global algorithm, wherein the term "evolutionary algorithm" should be understood to mean a collective term for genetic methods, a controlled random search (CRM; Controlled Random Search), and for methods of evolutionary theory according to Rechenberg.

In this way, global optimization of raster angle θ and raster period a takes place, going beyond the merely local optimization of θ and a for each individual of the evolutionary algorithm (i.e. ending at fixed values for the offset Vx and Vy, which can no longer be optimized).

Furthermore, it is proposed that the joint determination of the angle of twist θ and of the period length a is carried out in such a manner that from the digital image and/or a partial region of the digital image, first calculation for restriction of the range of possible numerical values for the end result of the angle of twist θ, preferably for restriction to an angle range of less than 5°, for example less than 2°, in particular less than 0.5°, and calculation for restriction of the range of possible numerical values for the end result of the period length a, preferably for restriction to a range of numerical values having a band width of ±5 pixels, for example of ±2 pixels, in particular of ±0.5 pixel is carried out, and that only after this restriction of the angle of twist θ and/or of the period length a, joint determination of the final numerical values for the end result of the angle of twist θ and of the period length is carried out, with reciprocal dependence on one another.

Thereby, the aforementioned algorithmic methods for determination of the angle of twist or raster angle θ and of the period length a are only used after the possible numerical values or end result values have first been restricted for both parameters θ, a, specifically to such an extent that the range of possible numerical values turns out to be significantly smaller than the parameter range that is fundamentally possible and is available for a complete search.

Thus, for example, the parameter range for the angle of twist θ, after taking symmetries into consideration, fundamentally comprises maximally an angle range from 0° to 90°, i.e. an angle range between −45° to 45°; all other conceivable angles can be replicated on an angle within this angle range.

Figure 8A:
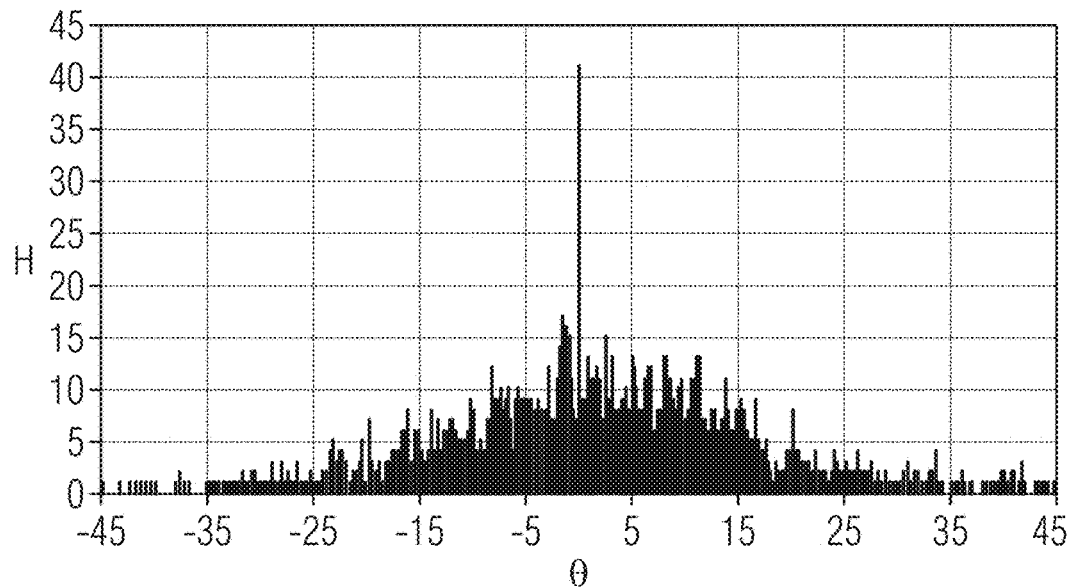
FIG. 8A is a histogram regarding the frequency of the inclination angles of connection lines between two raster elements, in each instance, of an image section according to FIG. 8C, for determining the angle of twist of the photographed raster.
Figure 8B:
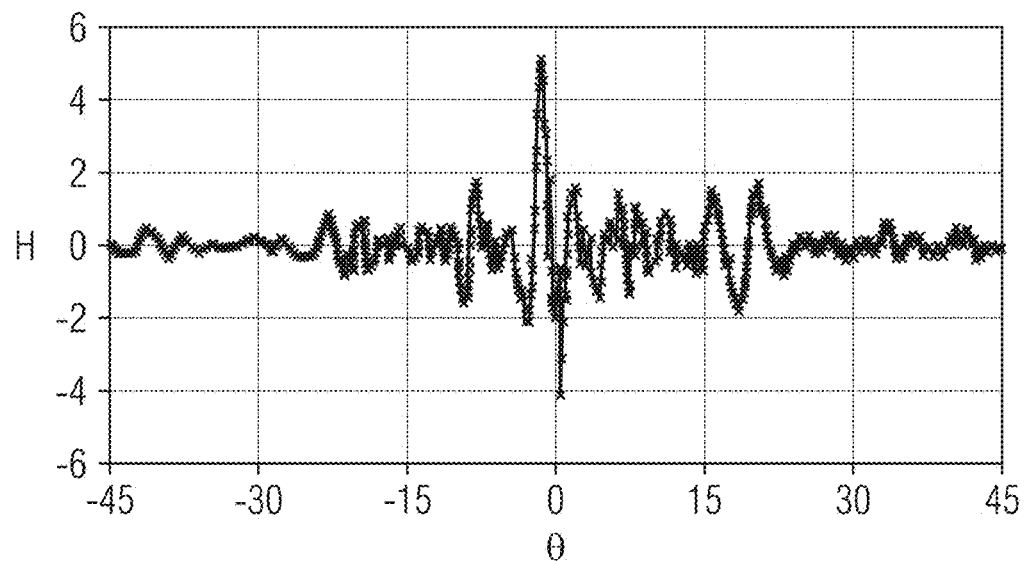
FIG. 8B is the histogram from FIG. 8A after undertaking smoothing over the inclination angles that occur.
Figure 8C:
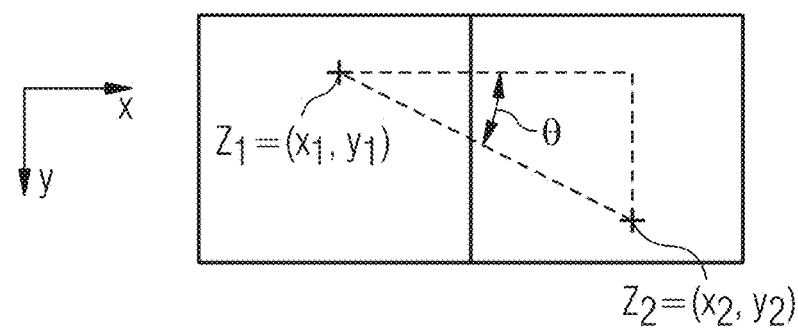
FIG. 8C is the image section of the digital image, used for determining the angle of twist of a photographed raster, shown schematically.

For finding suitable starting values (i.e. for the center of the search ranges) for the raster angle θ and the period length a (for insertion or use in the evolutionary algorithm, for example), in particular those values that contain the suitable value for the raster angle θ and the period length a, the method of procedure can be as follows:

For finding the center of a suitable search range for the raster angle θ, the following method of procedure according to FIGS. 8A to 8C is proposed:

Within the motif replicated in the digital image 6, a suitably large, rectangular (image surface) region (for example having a side ratio of 2:1) is selected, in which at least 100 centers Z of raster elements 1, 2 are arranged (it can be determined only after reconstruction of the raster, i.e. in retrospect, whether a specific raster element is positioned in the first or the second partial surface region and accordingly should be identified with 1 or 2). As shown in FIG. 8C, the selected image surface region can be subdivided, for example into a left and a right square. For all combinations of a raster center Z in the left square or the left half of the rectangular image surface region (with reference to the long, upper or lower edge of this rectangle), in each instance, and a raster center Z in the right square or the right half of the rectangular image surface region, in each instance, the inclination angle or pitch angle θ of the connection line between these two centers Z is calculated according to $$\theta(x_1, y_1; x_2, y_2) = -\arctan((y_2-y_1)/(x_2-x_1)).$$

The histogram shown in FIG. 8A is plotted over all these pitch angles for all the center pairs, i.e. over the angle range of −45° to +45°, for example in 0.1° steps.

This histogram is subsequently smoothed, for example by means of calculating the average over a range of ±0.5°; from this average over the ±0.5° angle range, the average over a comparatively larger angle range (for example averaged over an angle range of ±3°) is then subtracted, and thereby the smoothed histogram shown in FIG. 8B for the pitch angle is obtained.

In the case of a periodic raster at the angle of twist that leads to rotation in the direction of one of the period directions of this raster, particularly many connection lines (between two centers of raster elements, in each instance) possess precisely this inclination angle or at least an inclination angle that deviates only slightly from it. As a result, it is possible to identify inclination angles that occur in the search surface region of FIG. 8C with particular frequency, as a starting value that deviates only slightly from the final value for the angle of twist θ of the raster, with great probability, which value is particularly suitable for a more precise calculation of the actual, final, and precise value for the angle of twist θ, using one of the aforementioned algorithms and, in this regard, will lead to a correct end result for θ, with great probability; specifically, it is the value in the histogram in FIG. 7B that has the greatest frequency, in other words the global maximum of this histogram. In the smoothed histogram in FIG. 8B, this value of the (inclination) angle, which occurs with the greatest frequency, lies at approximately −2°.

Also, for the period length a, which is to be optimized or algorithmically determined jointly with the angle of twist θ, a suitable starting value is required.

The starting parameter for the raster period a (expressed as the number of image pixels), i.e. the center of the search region for the raster period a is estimated, in contrast, from the known absolute raster period of the printed raster, using the image resolution. The image resolution can be estimated on the basis of the known size of other surrounding, clearly visible elements within or outside of the raster.

In the joint optimization of the angle of twist or raster angle θ and of the raster period a (by a deterministic or stochastic randomized global optimization algorithm), the following boundary conditions, for example, are used:

raster angle of twist θ: ±0.5° around the starting parameter for θ, and raster period a: ±0.5 around the starting value a0.

The optimizations take place, for example, with the following precision:

for the raster angle θ (to be optimized): 0.1°, for the raster period a (to be optimized): 0.01 pixel.

As the optimization dimension F to be minimized for all optimizations, the average square distance of the centers from the next raster intersection, in each instance, serves for all the optimizations, i.e. F is calculated from the average of this term for every center (i.e. Z(x,y)=1) according to $$F = \text{average}_{x,y|z(x,y)=1}[(0.5-|0.5-x'_{post\_decimal\_component}|)^2 + (0.5-|0.5-y'_{post\_decimal\_component}|)^2],$$

wherein the coordinates x' and y' in the coordinate system of the raster 5 that is being sought and is to be reconstructed are used, in which the raster lines run along the whole-number coordinates. The joint optimization of θ and a, the suitable starting parameters of which were calculated as already explained above, takes place first in that Vx and Vy are calculated as follows. Only once the optimization of θ and a has been concluded and their final, correct values have been established are the offset coordinates Vx and Vy in turn optimized, for example by a gradient descent method. In this regard, the correct values that have already been calculated for the raster angle θ and the raster period a are used and no longer changed.

Within the scope of optimization for the raster angle θ and the raster period a, the values for the offset Vx and Vy are calculated as follows:

For all raster element centers Z, the ancillary variables $$hX(x,y) = x^*\cos(\theta) - y^*\sin(\theta) \bmod a$$

$$hY(x,y) = x^*\sin(\theta) + y^*\cos(\theta) \bmod a$$

are calculated, wherein mod represents the remainder of a whole-number division.

Subsequently, for all raster element centers Z, the values $$Vx(x,y) = hX(x,y)^*\cos(-\theta) - hY(x,y)^*\sin(-\theta)$$

$$Vy(x,y) = hX(x,y)^*\sin(-\theta) + hY(x,y)^*\cos(-\theta)$$

are calculated. The frequency of the numerical values obtained for the two offset value components Vx, Vy of the centers from FIG. 6 are plotted in FIG. 9 in the form of a histogram.

By means of a displacement by a value in the range of −a/2 to +a/2, every image dot can be displaced to a raster intersection, wherein a is the determined period of the raster.

Figure 9:
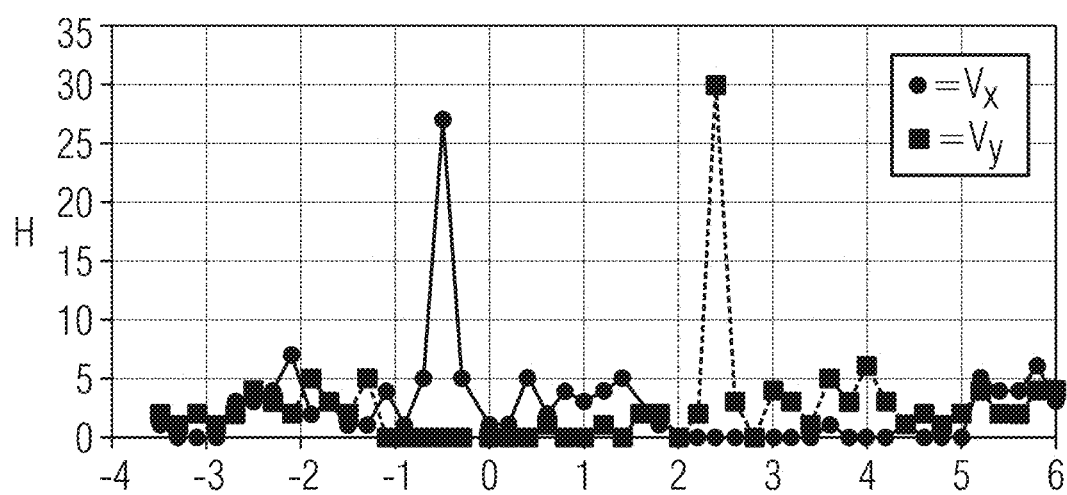
FIG. 9 is a histogram for the determined frequency of the calculated numerical values for a lateral offset of raster elements.

For this reason, in FIG. 9 the greatest frequency value H for the components Vx and Vy as the end result is selected precisely within this range from −a/2 to +a/2 for the general offset relating to the raster as a whole (and for its two components Vx and Vy). If, in FIG. 9, two equally great frequency maximums occur within the range from −a/2 to +a/2, for Vx or for Vy, only one of them is selected, and its numerical value or frequency value is established as the end result for the offset value Vx or for the offset value Vy.

Thereby, the four position parameters, parameters θ, a, Vx, Vy of the raster 5 shown in the digital image 6, have been determined. The reconstructed rasters represented by means of these parameters were aligned at the centers of the raster elements, and for this reason the centers of the raster elements (at least on average) lie on the raster lines or, if one looks at both surface directions together, actually on the raster intersections. The raster network therefore consists of the connection lines between the intersection points of the raster, of which a certain proportion is occupied by raster elements (wherein the raster elements or their centers can be offset in addition, i.e. optionally, relative to the intersection points, in pseudo-random manner).

In FIG. 4, in contrast, it is not these connection lines of the raster that are shown, but rather the boundary lines between adjacent base cells, in each instance, which separate the base cells from one another. In comparison to these base cell boundary lines shown in FIG. 4, the intersection points of the raster defined by the position parameters and the connection lines or raster lines generated thereby are displaced by half a raster period, in each instance; they mark the positions of the centers of the raster elements and specifically not the boundary lines between adjacent base cells.

Because the digital image 6 in general shows only the surface 100a of the imaged object 100, structured in raster shape, only in one part of its image surface, and furthermore also only a part of the imaged surface 100a (for example a surface section) is structured or imprinted in raster shape, the detected arrangement of raster elements 15 in general fills only a portion (under some circumstances a rather small portion) of the image surface of the image 6. Regardless, the raster reconstructed from this arrangement of raster dots is constructed as a two-dimensionally periodic, i.e. infinitely extended raster, which also extends beyond the image surface portion in which the related raster dots are replicated, and thereby reaches or is continued at least all the way to all the image edges of the digital image (or the images for $K_2$, $K_{2,inv}$, $V_2$, etc. derived from it by means of post-processing), specifically even regardless of the circumstance that in comparison to the original template or digital template 9, ultimately only a certain image section (FIG. 11) of this continued raster is required.

The reconstructed optimal offset values Vx and Vy (in a value range that comprises merely a single period length a along the corresponding direction; here, in other words, ranges from zero to a or, alternatively, from −a/2 to a/2) thereby define only a (precision) offset of the reconstruction raster 5, which has already been continued to the image edge and is correctly oriented relative to the digital image surface.

Because the digital template 9 defines the positions of the raster elements 15 relative to an origin point or reference point (for example the left, top image corner of the digital template 9), but the raster dots actually detected are arranged somewhere within the image surface of the digital image (covered by the reconstructed, continued raster 5), it must additionally be indicated by what number of period lengths a along the two coordinate directions x', y' the reconstructed raster must be displaced so that the respective reference points (for example the coordinate origins) of the raster predefined in the surface of the digital template 9 and of the reconstructed raster 5 continued in the image surface of the digital image come into coverage with one another. To do so involves (rough) positioning, i.e. displacement of the reconstructed raster by a whole number or a whole-number quantity of (respective) period lengths a, in each instance.

The previously calculated, required (precision) offset by maximally one period length a, in each instance (in accordance with the optimized (precision) offset values Vx and Vy), in contrast yields the much smaller "remainder" of the overall displacement (which does, however, require optimization as in FIG. 9); the total offset to be used is the sum of rough offset and precision offset along the corresponding coordinate direction x', y' of the reconstructed raster 5.

Figure 11:
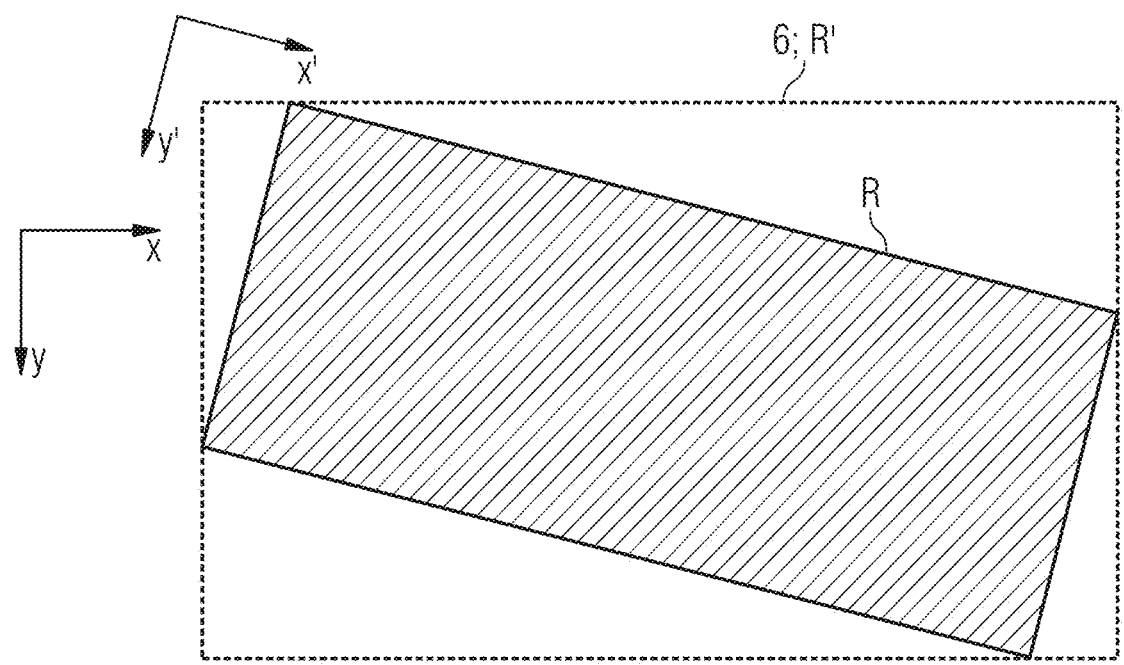
FIG. 11 is a schematic representation of the position of the raster in the digital image.

Finally, the image is supposed to be positioned upright, i.e. not rotated relative to the raster 5, which extends, according to FIG. 11, over the hatched rectangle R, for example.

For this purpose, the image section structured as a rectangle R, for example (hatched in FIG. 11) of the digital image 6, which reliably contains the raster 5, is selected and repositioned, namely brought into the same position and orientation as the position and orientation of the reconstructed raster in the file template (FIG. 3 and FIG. 4). For this purpose, the selected (for example rectangular) image surface region R, (which comprises the reconstructed raster), is transformed to a rectangle that stands upright, i.e. is oriented without rotation. The position of the rotated rectangle R, which contains the reconstructed raster, is shown in FIG. 11 with reference to the digital image 6 (image section structured as rectangle R', dotted line). The transformation therefore merely means that the image information of the digital image is now represented in the coordinates of the coordinate system of the raster 5 being sought and to be reconstructed, instead of as before in the image coordinates x, y, and thereby is shown in the coordinate system of the reconstructed raster. The result is an image V(x',y') rotated upright in the coordinates x' and y'.

Now the reconstructed raster 5 lies in front, and thereby (as described using FIG. 11) the location of the base cells of the digital template 9 (FIG. 3) lies within the digital image 6 (FIG. 5). The reconstructed raster 5 makes it possible to recognize a very specific raster element 15, predefined in the original digital template 9, from the gray-value contrast distributions $K_2(x,y)$ and $K_{2,inv}(x,y)$ at specific positions (x, y) within the image of the gray-value contrast values there, as a gray-value contrast, and thereby to determine that precisely the respective positions (x, y) correspond or must correspond to a raster element 15 that has already been predefined (specifically either 15a or 15b), if the printed pattern on the object 100 is authentic.

Independent of the reconstruction of the rasters being sought, the brightness values, which are dependent on the position of the image pixels (x, y) and make up the actual image content of the digital image 6, must also be used so as to be able to make statements regarding the property of the replicated object surface 100a or its rasters (for example its genuineness or authenticity or the occurrence and, if applicable, the distribution of different dot sizes, brightness values and/or colors).

In order to eliminate brightness gradients (in other words a brightness difference) over the image as a whole, local gray-value contrast values $K_2(x,y)$ are calculated, for example according to $$K_2(x,y)=\text{MAX}_{(i,j=-3\ldots+3)}(M_2(x+i, y+j))-\text{MIN}_{(k,l=-2\ldots+2)}(M_2(x+k, y+l))$$

Figure 10A:
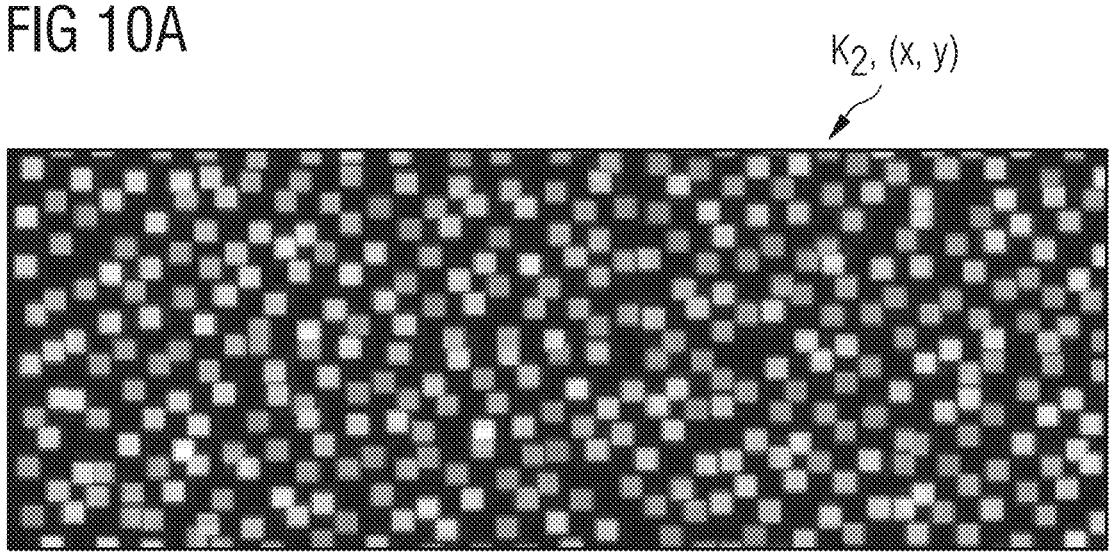
FIGS. 10A and 10B are derived digital images, the brightness of which reproduces the local contrast $K_2$ and the inverted local contrast $K_{2,inv}$ (using the positions of the raster intersections of the reconstructed raster)

The index "2" indicates the use of the digital image 6 smoothed according to $$M_2(x,y)=B(x,y)+\tfrac{1}{9}*\Sigma_{(i=-1,0,+1,\ j=-1,0,+1)}B(x+i, y+j),$$

and the size used here for the search range for the local maximum brightness, having a running width of (here, for example) 7 image pixels, is slightly smaller than the raster period of (here, for example) 7.5 image pixels, so that usually only the value of the single, closest gap between raster elements 15 flows into the calculation. A running width of 5 image pixels is sufficient for the search range, so that only the value of the single, closest raster element 15 flows in, which can be situated (in the case of the exemplary embodiment presented as an example in FIG. 6), for example, within only 3 of 5 sub-cells of the base cell, corresponding to 4.5 image pixels; without an optional offset variation of the centers (as shown in FIG. 6), even the non-displaced pixel alone is sufficient for determining the local minimum brightness. The contrast $K_2(x,y)$ calculated in this manner is shown in FIG. 10A.

Furthermore, the inverted contrast $K_{2,inv}(x,y)$ of the (smoothed) digital image 6 is required. Calculation of $K_{2,inv}(x,y)$ takes place in that the brightness values $K_2(x, y)$ of all the pixels (in other words for all the pixel coordinates x, y) of the digital image 6, i.e. the brightness values shown in FIG. 10A are brightness-inverted, specifically around a local average brightness value, for example by the average MW of the local highest and the local lowest brightness value, i.e.

$$MW[\text{MIN}_B(M_2(x,y));\ \text{MAX}_B(M_2(x,y))],$$

wherein $\text{MIN}_B$ refers to the lowest and $\text{MAX}_B$ to the highest brightness value in the local surroundings B. This brightness inversion takes place over a square image surface region B within the digital image 6 of FIG. 10A, wherein the square image surface region B possesses a side length, for example, that corresponds to a number of (2*a+1) pixels, i.e. that is slightly larger than two raster periods a. As a result, not only the highest brightness value of the closest raster element but also the lowest brightness values of the gaps between the surrounding raster elements can flow in. The local inverted values of the gray-value contrast are calculated according to:

$$K_{2,inv}(x,y)=MW(\text{MIN}_{(i,j=-6\ldots+6)}(K_2(x+i, y+j));\\ \text{MAX}_{(i,j=-6\ldots+6)}(K_2(x+i, y+j))) - (K_2(x,y)-\\ MW(\text{MIN}_{(i,j=-6\ldots+6)}(K_2(x+i, y+j));\\ \text{MAX}_{(i,j=-6\ldots+6)}(K_2(x+i, y+j))))$$

or, stated more briefly $$K_{2,inv}(x,y)=2*MW(\text{MIN}_{(i,j=-6\ldots+6)}(K_2(x+i, y+j));\\ \text{MAX}_{(i,j=-6\ldots+6)}(K_2(x+i, y+j)))-K_2(x,y).$$

Figure 10B:
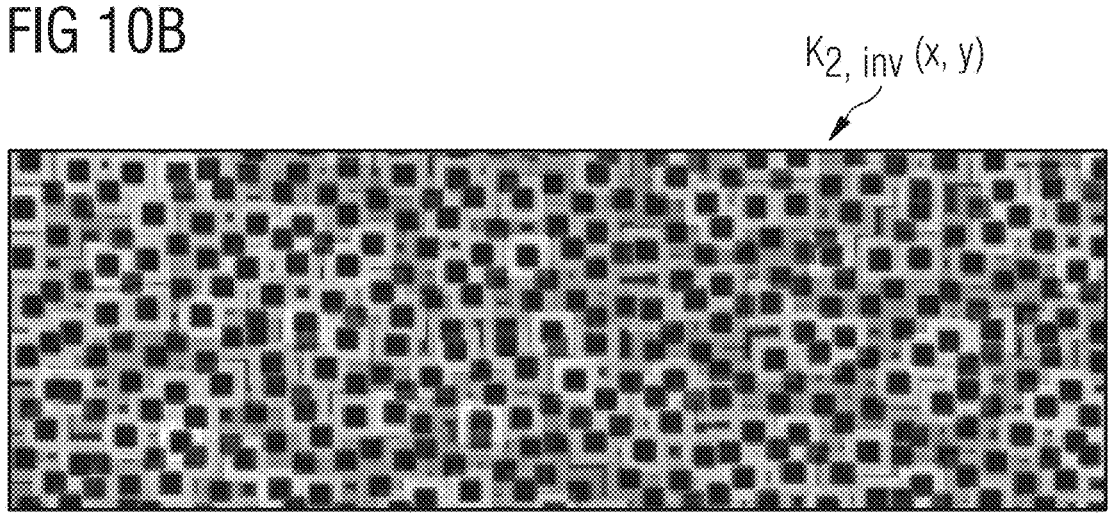
Figure 10C:
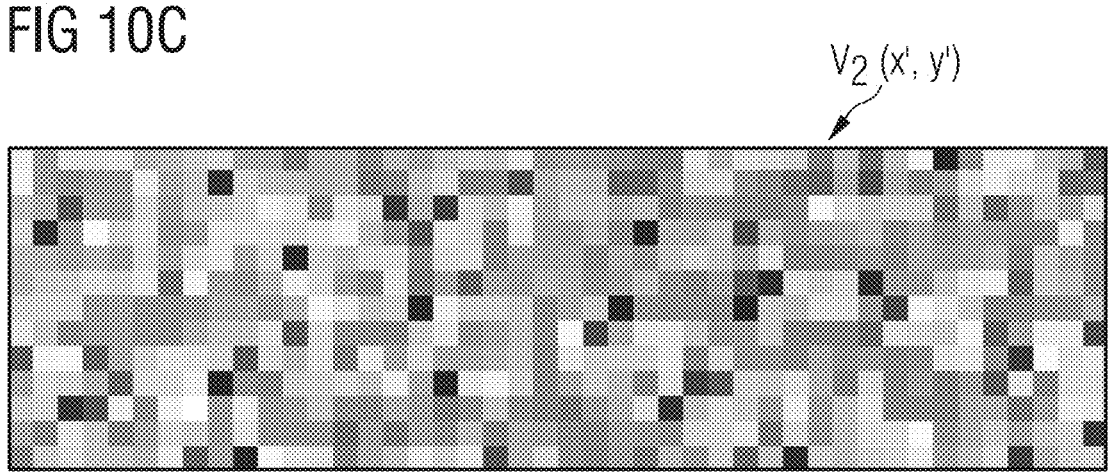
FIG. 10C is a digital image derived from FIGS. 10A and 10B, in which the greater of the two values is selected, in each instance, of the local gray-value contrast value and the inverted local gray-value contrast value.

The inverted contrast $K_{2,inv}(x,y)$ calculated in this manner is shown in FIG. 10B. Calculation of $K_2(x,y)$ and $K_{2,inv}(x,y)$ can be carried out before, during or after reconstruction of the raster 5, in terms of time.

When not only $K_2(x,y)$ has been calculated from $K_{2,inv}(x,y)$, but also the raster 5 has been reconstructed, the function defined as follows is calculated for evaluation of the variation of the detected raster elements in the digital image according to size, brightness and/or color:

$$V_2(x',y')=\text{MAX}(K_2(x,y);\ K_{2,inv}(x,y)),$$

i.e. from the two contrast images $K_2(x,y)$ and $K_{2,inv}(x,y)$, for every image dot (x, y) the ($K_2$ or $K_{2,inv}$) having the greatest gray-value contrast value (which indicates either the level of the gray-value contrast or of the inverted gray-value contrast) is selected, and the selected values are combined in the image $V_2$. For those calculated positions of raster intersections of the reconstructed raster at which a brighter gray value is shown in FIG. 10A than in FIG. 10B, this brighter gray value from FIG. 10A is shown in the image $V_2$ in FIG. 10C, and for those calculated positions of raster intersections of the reconstructed rasters at which a brighter gray value is shown in FIG. 10B than in FIG. 10A, this gray value from FIG. 10B is shown in the image $V_2$ in FIG. 10C.

It is practical if the image $V_2(x',y')$ is already calculated in the surface region that the raster (in general rotated and displaced by an offset) takes up within the image surface, if it is generated by the raster elements 15 or raster dots that are actually replicated. Thereby, the image $V_2(x',y')$ is reconstructed directly as an upright image.

From this reconstruction, histograms for the two sizes or diameters (or, alternatively, brightness values), i.e. for the different parameter values p1, p2 of the raster elements 15 are drawn up and plotted above the gray-value contrast levels G.

In accordance with its construction, the hidden image $V_2(x',y')$ contains jumps in the contrast.

It is true that assignment of the raster elements 15 having the brightness values in the image $V_2(x',y')$ to the brightness and/or size of one of the two types of raster elements 15A, 15B is not possible using the image $V_2(x',y')$ alone. Nevertheless, whoever is in possession of the digital template (for example according to FIG. 3 or FIG. 4), as the originator or authorized manufacturer of the printed patterns on the object 100, can read from it to which raster element within the raster (in accordance with the construction in the digital template 9) which of the two printed dot sizes or brightness values and/or colors is assigned. He/she can thereby check, for every raster dot 15, whether it is actually implemented in the printed pattern with the planned brightness values or size values—whether it is the first brightness value or size value p1 for first raster dots 15a or the second brightness value or size value p2 for second raster dots 15b. This assignment is not possible for any unauthorized imitator.

Using the assignment, however, the actual brightness values or size values p1, p2 determined for all the raster elements can be plotted separately, and plotted separately as a histogram for each type of raster element 15a, 15b, above the contrast. In this regard, the goal is to determine what statistical proportion of the small and large raster elements 15a, 15b, in each instance—in spite of some losses in the creation or reconstruction of the printed pattern—is actually implemented on the object 100 with the correct size, brightness and/or color, predetermined by the digital template.

Figure 12A:
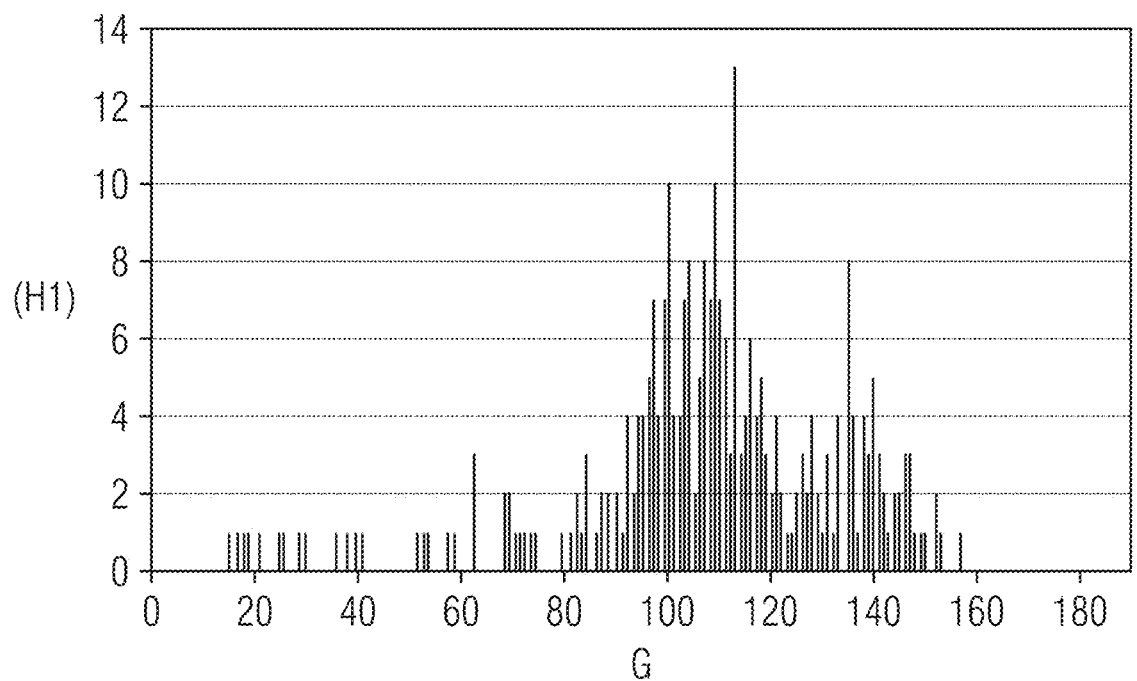
FIGS. 12A and 12B are histograms produced separately for smaller and larger raster dots, regarding the frequency of the locally selected greater gray-value contrast values, in each instance, contained in FIG. 10C.
Figure 12B:
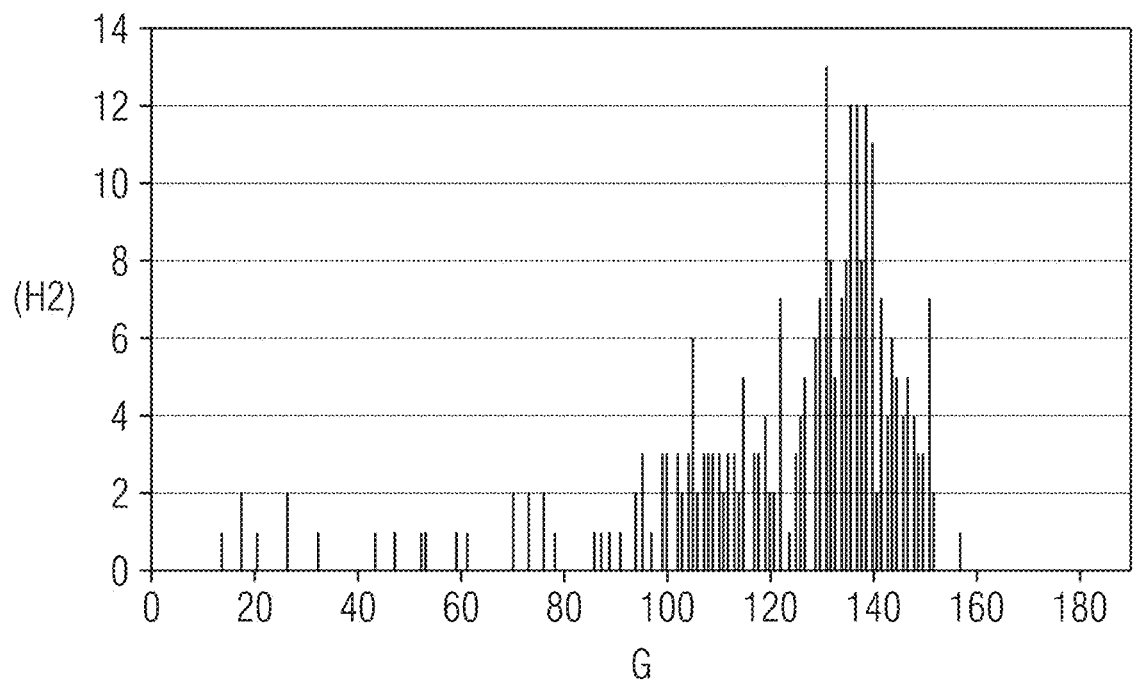

FIGS. 12A and 12B show the histograms $H1=H_{small}$ and $H2=H_{large}$ totaled over all the image dots, i.e. raster elements 15 of the hidden image $V_2$, separately for the small (or somewhat smaller) raster dots 15a and the large (or somewhat larger) raster dots 15b; the digital template according to FIG. 3 or FIG. 4 indicates which raster dot on the object (if its printed pattern is authentic, i.e. not forged) would have to have which of these two variables (in general: sizes, brightness values and/or colors), so as to assign the contrast value of each raster center 15 to the correct histogram, in each instance (in other words either $H1=H_{small}$ or $H2=H_{large}$). What is plotted above the differently large gray-value contrast levels G is the corresponding frequency H at which this gray-value contrast level occurs within the hidden image $V_2$. The parentheses of the frequency distributions (H1), (H2) of the raster elements 15a, 15b in FIG. 12A and FIG. 12B indicate that another suitable smoothing must be undertaken before interpretation and further calculation can follow.

Figure 13:
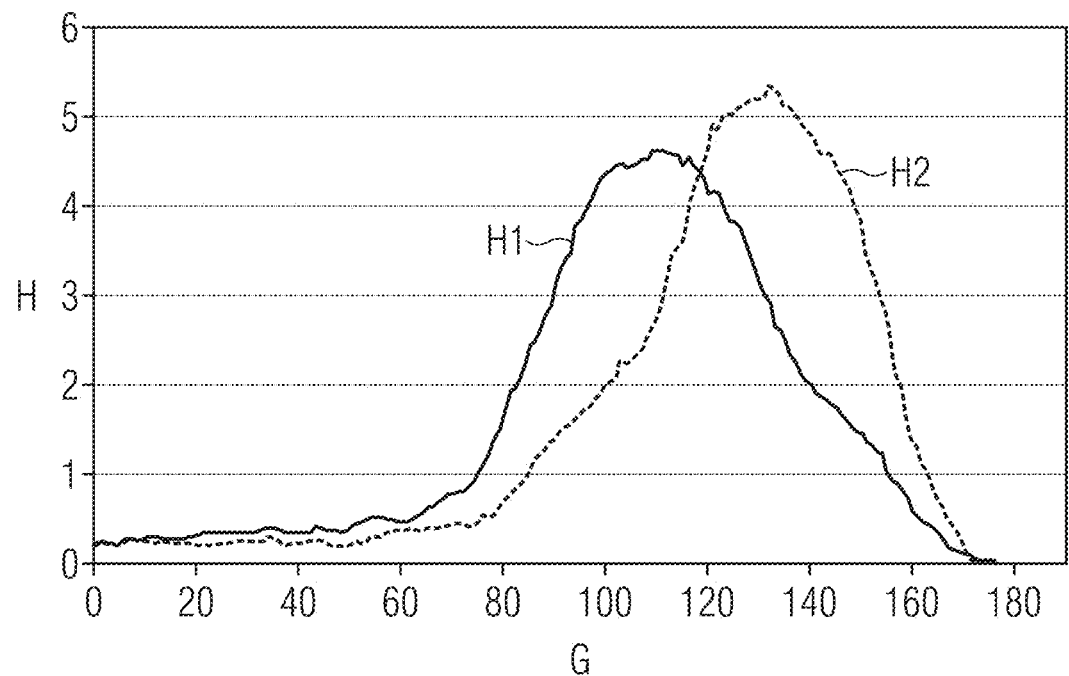
FIG. 13 are the two histograms from FIGS. 12A and 12B, smoothed, in each instance, and plotted jointly.

If both histograms are still smoothed over a range that reaches, in this case, up to ±19 gray-value contrast levels on both sides of the respective nominal gray-value contrast values, then more descriptive and more easily interpreted histogram curves occur, which are plotted jointly in FIG. 13. The smoothed histograms $H1=H_{small}$ and $H2=H_{large}$ possess a maximum frequency value, in each instance. The two gray-value contrast levels that possess this maximum frequency value, in each instance, are offset relative to one another in the direction of the horizontal axis on which the gray-value contrast is plotted; this offset corresponds to the difference in size, brightness and/or color of the differently structured types of raster dots 15a and 15b.

Figure 14:
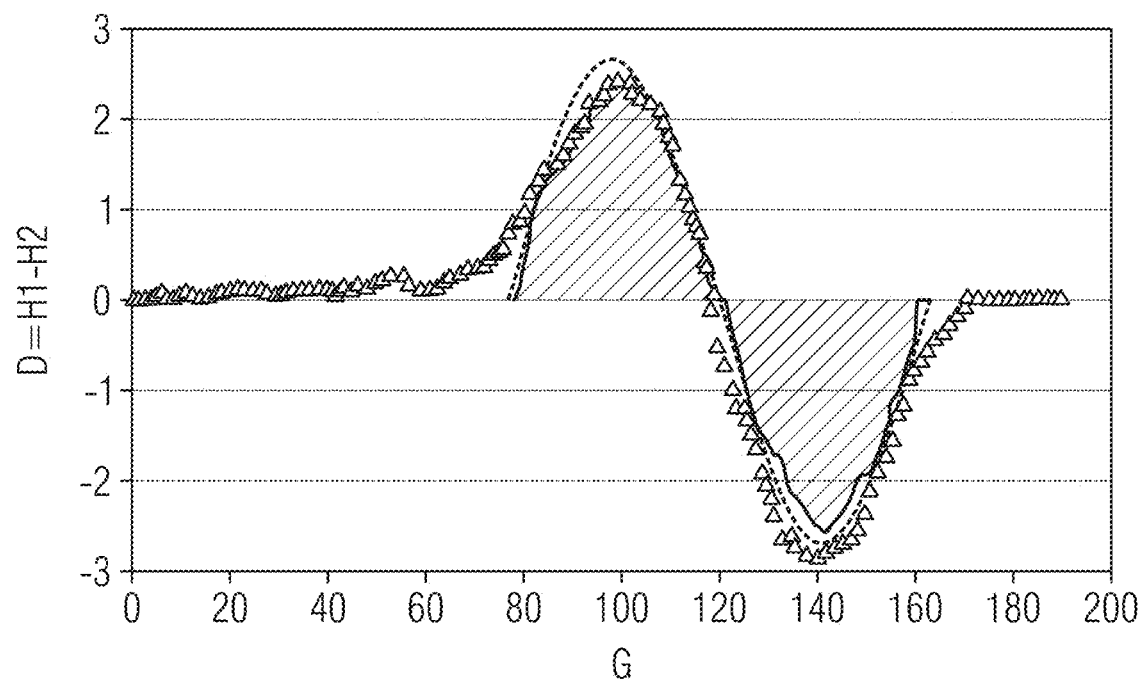
FIG. 14 is the difference histogram of the two histograms from FIG. 13, as well as an additional fit function for calculating a quality value.

The difference between the histogram numbers for the small and for the large printed dots will still be calculated, i.e. $D=H_{small}-H_{large}=H1-H2$, as shown in FIG. 14 in the form of (tightly crowded) difference values marked with triangles.

The pattern that is planned in the digital template 9 and was printed onto the object 100 and photographed from there, and the photo 6 or replica A of which was investigated in accordance with the method described herein contains a raster in which a ratio of 50:50 was predetermined as the amount ratio between the small raster elements 15a and the large raster elements 15b. In such a case, the difference curve $D=H_{small}-H_{large}=H1-H2$ in FIG. 14 must have a zero crossing between those two gray-value contrast values that have the two frequency maximums (although this difference curve represents an approximation; instead of the corresponding frequency maximum, it would also be possible, alternatively, to calculate the corresponding average of the gray-value contrast level, averaged in accordance with the frequencies over the entire gray-value contrast axis, and to use this average for further consideration starting with FIG. 14).

In view of the distribution ratio of 50:50, a sine function is therefore suitable as a good approximation for the difference curve D in FIG. 14. For this reason, a sine curve $F_0$ as in FIG. 14 is represented by the dotted line fitted to the difference curve D beyond a sine period.

Because the adaptation parameters of the sine curve are not independent of one another, a pure gradient descent method does not have to lead to a successful fit in every case. Preferably, therefore, a global optimization algorithm is used for the fit or for fitting of the sine function (or, more generally: the fit function), for example a deterministic global optimization algorithm or a randomized global optimization algorithm. A suitable stochastic global algorithm is, for example, an evolutionary algorithm, a genetic method, a controlled random search (CRM; Controlled Random Search) or an evolution theory method according to Rechenberg.

For this purpose, suitable starting parameters for the sine function first have to be predetermined, namely for its amplitude, for its period, and for the location on the gray-value contrast axis, for example the gray-value contrast value at which a sine period begins. As the optimization starting parameter for the amplitude of the sine function, $$\text{Amplitude}_{starting\ parameter}=(|MAX(D)|+|MIN(D)|)/2$$

is selected, wherein |MIN(D)| or |MAX(D)| represents the absolute value, i.e. the amount of the minimum or the maximum of the difference curve D. The optimization starting value of the one sine period can be selected, for example, at a gray-value contrast of 0.5 times the maximum gray-value contrast level of D, with a frequency value different from zero. Furthermore, the optimization starting value for the period of the sine curve is defined in such a manner that it is twice as great as the horizontal distance between two frequency extremes of D in FIG. 14. For the band width over which the starting value of each of these three parameters is allowed to vary, the numerical range of 0.5 to 2.0 times the corresponding starting parameter is predetermined, for example.

For calculation of the quality dimension from fitting, i.e. optimal cling of the fit function or sine function $F_0$ to the difference function D, first the fit surface A is calculated according to $$A=\text{SUM}(|F_0|-|(F_0-D)|, \text{ if}>0 \text{ and otherwise } 0).$$

Accordingly, the histogram difference values D are summed up for only those contrast values for which the above difference is positive, in other words the deviation between the corresponding value $F_0$ on the sine curve (shown with a dotted line in FIG. 14) and the difference value D (shown with triangles) is not greater, in terms of amount, than the amount of the sine value $F_0$ itself. In this regard, the condition "otherwise 0" applies individually to every summand of the sum; i.e. if the related difference amount $|F_0|-|(F_0-D)|$ is greater than zero there, it is included in the sum, and if it is less than zero it is ignored. For this reason, no negative summands flow into the sum formation.

Subsequently, the fit component R is calculated as A divided by the absolute amounts of the measured values (shown with triangles in FIG. 14) of the difference function $D=H_{small}-H_{large}=H1-H2$, over the entire gray-value contrast band width (horizontal axis in FIG. 14). In this manner, the independence of the quality measurement from variations in the brightness, in general, and from brightness contrast or gray-value contrast of the camera image, in particular, is guaranteed.

In order to obtain a measure for the quality of genuineness, i.e. for the fidelity of the pattern printed onto the object 100 relative to the digital template 9, finally the quality measurement Q is calculated according to $$Q=\text{Period}/2*R$$

wherein Period represents the period of the fit of the sine function and the value Q can be a dimensionless number, for example a two-digit or three-digit number. If the quality measurement Q lies above a specific threshold $Q_{critical}$, then the result of the check of the security feature is positive; otherwise it is negative, and this result is an indicator of an imitated raster pattern, not true to the original, on the object.

In the case of other frequency ratios between the two raster element sizes or brightness values, differing from 50:50, the form of the fit function for the difference curve $D=H_{small}-H_{large}=H1-H2$ in FIG. 14 increasingly deviates at the outer edges of the period interval considered until now and outside of it.

It is clear that the quality measurement Q is proportional to the amplitude of the fit function in relation to the summed-up difference values of the contrasts $D=H_{small}-H_{large}=H1-H2$; an authentic printed pattern yields a sine function having a larger amplitude on the vertical axis for $D=H_{small}-H_{large}=H1-H2$, because only relatively few raster elements 15 contribute to difference function values to the right or the left of the sine bulges.

Figure 15:
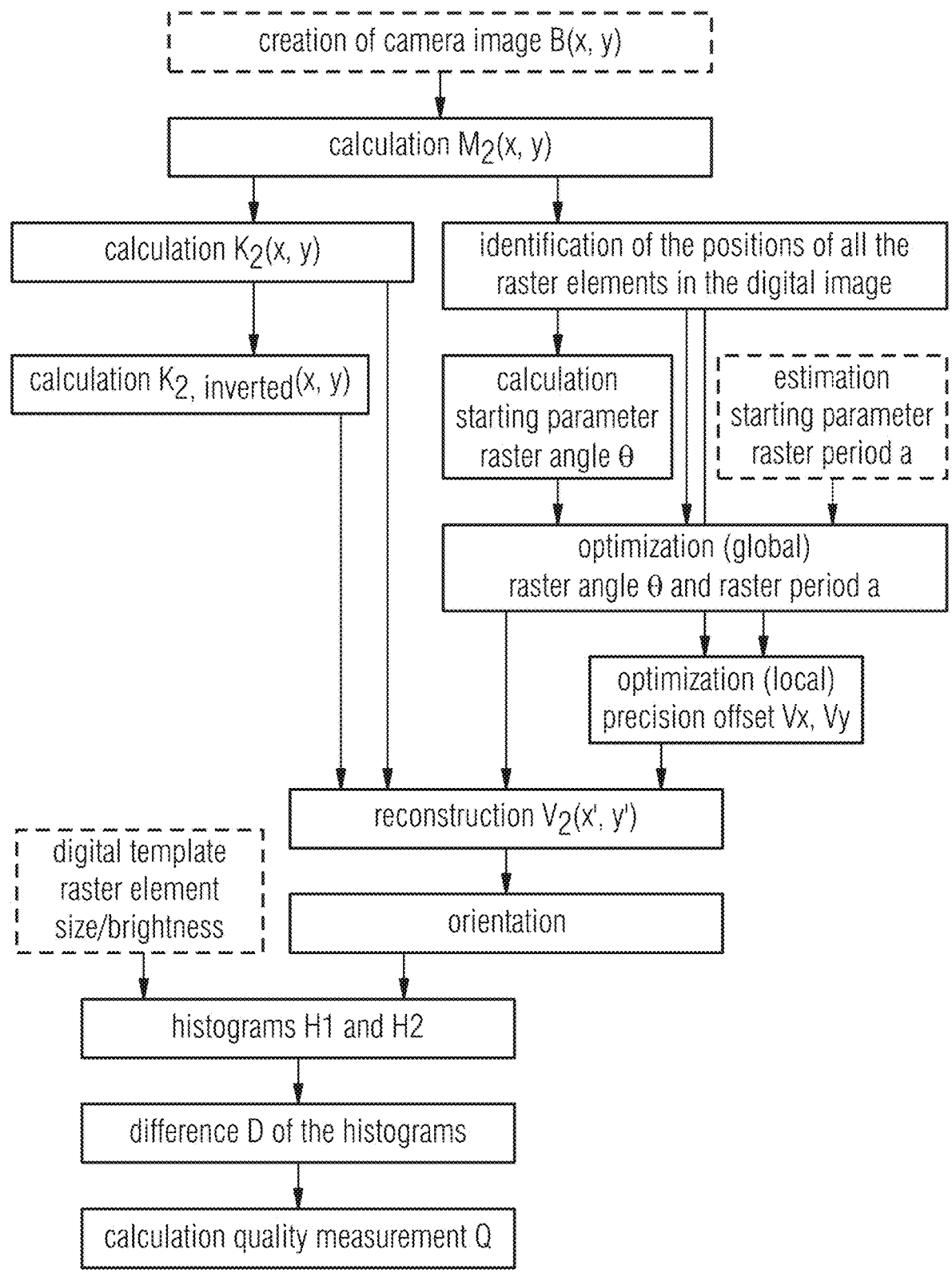
FIG. 15 is a flow chart of the method for checking a surface structured in raster form.

FIG. 15 shows a flow chart in which the sequence of method steps explained until now is illustrated for the method for checking an object surface structured in raster shape. After creation or at least acquisition of the camera image 6 to be used (FIG. 5), which contains the replica A of the surface as the image content from image values B(x, y), first optional smoothing of B(x, y) was undertaken, also taking adjacent pixel values into consideration.

From the image function (in other words here, the smoothed image function $M_2(x, y)$), on the one hand the raster was reconstructed (FIGS. 7 to 9 and 11); on the other hand, the contrast $K_2(x, y)$ (FIG. 10A) and from it the inverted contrast $K_{2,inv}(X, y)$ (FIG. 10B) was calculated from $M_2(x, y)$.

For the construction or reconstruction of the raster 5 from $M_2(x, y)$, the position of their corresponding raster element center was calculated for the raster dots or raster elements recognized within the image surface of the digital image, specifically first for each raster element 15 individually and still without taking any raster into consideration, because the raster 5 must first be (re)constructed from the individual center positions in the digital image that have actually been detected. Possible multiple centers (FIG. 7) can be avoided by means of suitable measures.

After calculation of the starting parameter for the rotation of the coordinate system of the raster relative to the format frame of the digital image, i.e. for the angle of twist θ (FIGS. 8A to 8C) and estimation of the starting parameter for the period length a of the raster, these two parameters were optimized simultaneously, i.e. jointly, using a global optimization method; subsequently, the optimal offset values Vx and Vy were determined so as to displace the raster 5 having the period a, which raster has been rotated by the angle of twist θ, relative to the digital image, along its coordinate axes x, y, so that the reconstructed raster fits, on average, on the raster element positions individually detected in the image 6 or A.

By means of the location of the raster 5 in the digital image 6 (i.e. in particular, the relevant image cutout R of the raster 5 that is suitable for a comparison to the digital template 9) and the images $K_2(x, y)$ for the contrast and the inverted contrast $K_{2,inv}(x, y)$ (FIGS. 10A and 10B), the image $V_2(x',y')=\text{MAX}(K_2(x,y); K_{2,inv}(x,y))$ calculated from the maximum gray-value contrast values of the two was created and compared with the digital template 9, from which it was evident which of the photographed raster elements 15—if the printed raster on the object is authentic—must be large or/and dark and which of the raster elements 15 must be small or/and bright. Only this comparison allowed assignment of the actual raster element positions in the digital image 6 to two separate histograms— an $H_2$ for the large or/and dark raster elements 15b and an H1 for the small or/and bright raster elements 15a.

Formation of the difference histogram $D=H_{small}-H_{large}=H1-H2$ and subsequent optimization of a sine function or fit function from the multitude of measurement values in D (as a function of the gray-value contrast levels G) made it possible to calculate a dimension-free number that is suitable as a quality measurement Q, using the fit component of the fit function, which number, spoken clearly, reproduces how "complete" the values of the histogram for D follow the fit function, i.e. contribute to the amplitude of the (sine) fit function in the interval of the sine period (the two extreme values of which lie at a horizontal distance from one another, which distance should correspond to the predefined contrast difference between bright and dark or between small and large raster elements 15a, 15b), instead of being recognizable as related raster elements on the object 100, due to their overly high or overly low contrast values, which thereby lie outside of the period interval of the sine fit function, as not belonging in accordance with the predefined (here 50:50) distribution (of raster elements 15a, 15b having precisely the two predefined sizes and/or brightness values).

With the aid of the method explained using FIGS. 1 to 15, for checking a surface of an object imprinted and/or structured in raster form, a property of the identification of the object formed in this way, in particular the genuineness or authenticity of this identification can be checked. In particular, if the real printed dots or raster elements in the pattern on the object make it possible to sense two or more (fundamentally different) values for size, brightness and/or color of the raster elements, nevertheless, using the histograms investigated, a statistical statement is possible about the extent to which an originally predefined division of raster elements into large/small and/or dark/bright raster elements, as it is predefined by means of the authentic original printed template or digital template—although loss-free reproduction without prior knowledge of their distribution is not possible for anyone (neither the forger nor the manufacturer)—is fulfilled or not fulfilled by the real raster that is contained in the identification and/or implemented by it; if the Q value is too low, the visual identification of the object is not authentic but rather imitated or forged. This statement can be made by means of the method and by means of the smartphone, some other picture-taking device or also by means of a server on the Internet, and can be output to another unit or another device and/or displayed to the user of the smartphone or picture-taking device.

Due to the raster dot size distribution and/or raster dot brightness distribution, which can hardly be implemented in loss-free manner, which can furthermore be used as an underlay within any desired motif, as a security feature of this motif, it is not even necessary to structure the raster elements in the identification on the object to be so small that at most, noise patterns can still be produced from them, which can be used only as independent noise patterns having their own, additional surface region, and without the possibility of using some other, freely selectable visual identification as an underlay.

Anyone who does not have possession of the digital template 9 can at most achieve a histogram that is a superimposition of the two histograms from FIGS. 12A and 12B and does not permit any kind of conclusion regarding the quality by which it has imitated a possible distribution of the sizes, brightness values and/or colors of the raster dots on the object, which distribution might have been predefined elsewhere.

Of course, the steps of the above method can be modified; some modifications will be explained below.

The method for checking a (property of a) surface of an object imprinted and/or structured in raster form, as explained up to this point, can also be used for those patterns or rasters or for those raster-form surface structures which are not or not only based on a security feature that relates to the size, brightness and/or color of the raster dots (or on which it presumably could be based), but rather also for those surface structures that are based on an additional, in particular an even more noticeable security feature, for example one that is intended to be superimposed on and to disguise the security feature described above ("plausible deniability," see above).

An example of such an additional, more noticeable security feature and its recognition by means of the above but slightly modified method will be explained below.

Figure 18A:
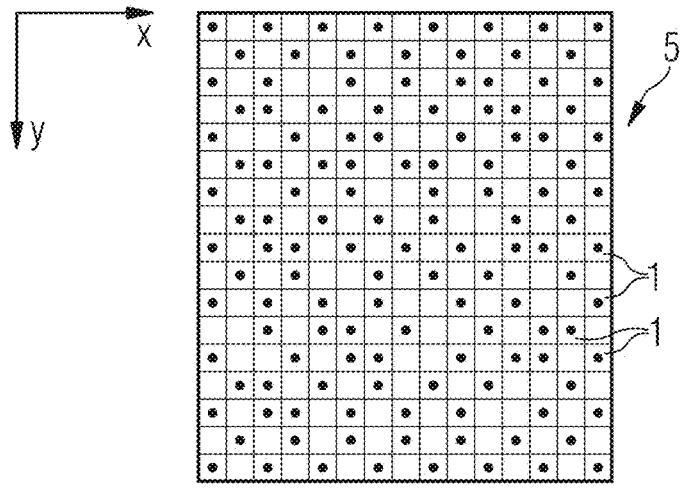
FIGS. 18A to 18C show the design principle underlying a further development for hiding information in a raster to be reconstructed.
Figure 18B:
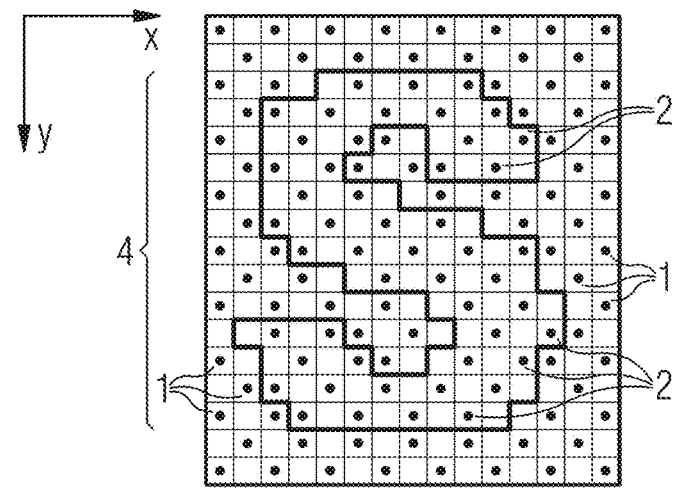

FIGS. 18A and 18B illustrate the design principle of this exemplary, more noticeable security feature alone (i.e. still without superimposition with the actual variation of the raster dot size, brightness and/or color), with which more easily accessible information 4 in a surface 100a of an object 100 structured in raster shape can be hidden. Similar to FIG. 4, also in FIG. 18A approximately every other base cell is "filled" with a raster element 1 or 2 (or occupied by it, covered by it or in any case assigned to such a raster element 1), specifically in systematically alternating manner as a function of the position within the raster 5. Such raster intersections or base cells (of the corresponding digital template), for the coordinates of which the condition $x+y=2n$ is met ("even" base cells, wherein n represents a whole number that can be selected in any desired manner), are filled by a raster element 1, whereas the other raster intersections or base cells (with $x+y=2n+1$) remain unoccupied; alternately ("like a checkerboard"), every other base cell remains unoccupied (or vice versa), at least in a first partial surface region 10 (cf. FIG. 18C) of the surface of a motif to be printed in raster form (or to be produced in some other way). This arrangement holds true at least for a first partial surface region 10. Furthermore, as in FIG. 18B (specifically exclusively in the surface region of a remaining, second and complementary partial surface region 20—the surface content or outline contour 20a of which corresponds to information 4 that is to be hidden) occupation of the base cells is inverted, i.e. raster elements 2 are placed in base cells in which there are no raster elements until now (according to $x+y=2n+1$), and in the second partial surface region 20, no raster elements are provided in base cells in which (according to the non-inverted occupation rule for the other first partial surface region 10, namely $x+y=2n$) raster elements should actually be situated.

Figure 18C:
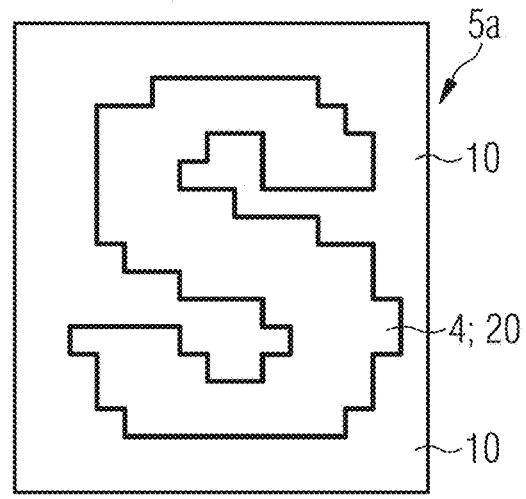

FIG. 18C shows, in the raster base surface 5a of this raster 5, the surface region in which no inversion has taken place (and which is therefore called the "first partial surface region 10" here), as well as the surface region in which the inversion was carried out (and which is therefore referred to as the "second partial surface region 20" here). In FIG. 18C, the boundary between the two partial surface regions 10 and 20, which thereby forms the contour of the second partial surface region 20, runs along the separation lines between adjacent base cells.

In FIG. 18B and FIG. 18C, it can be seen that the second partial surface region 20, which is formed or generated by the inverted base cells, possesses a surface expanse or outline contour 20a that corresponds (except for inaccuracies at the edge) to the hidden but still comparatively noticeable information 4, namely the letter "S."

The first partial surface region 10 and/or the second partial surface region 20 can optionally be cohesive or multi-part. The raster 5 has a deviation, i.e. a systematic deviation that is formed in the second partial surface region 20 but not in the first partial surface region 10, so that the extent, expanse and/or distribution of the deviation, in terms of area, predetermines the second partial surface region 20 and/or its surface distribution or contour 20a. The hidden information 4 or its negative image is thereby coded by means of the second partial surface region 20 and/or by means of its surface distribution or contour 20a.

The actual, comparatively less noticeable security feature of the variation of the size, brightness and/or color of the raster element (as in FIG. 4) is now superimposed on this additional security feature, which is comparatively more noticeable due to its displacement of positions of entire cohesive groups of raster elements (in the form of the hidden information 4 or "S" that is coded by means of occupation inversion). In the actual digital template (not shown), occupation inversion and size/brightness variation are combined with one another; furthermore, a further letter C, going beyond the "S," in other words the lettering containing the letters "SC" will be contained there as coded hidden information 4 or will be made visible by means of the method described below.

Figure 21:
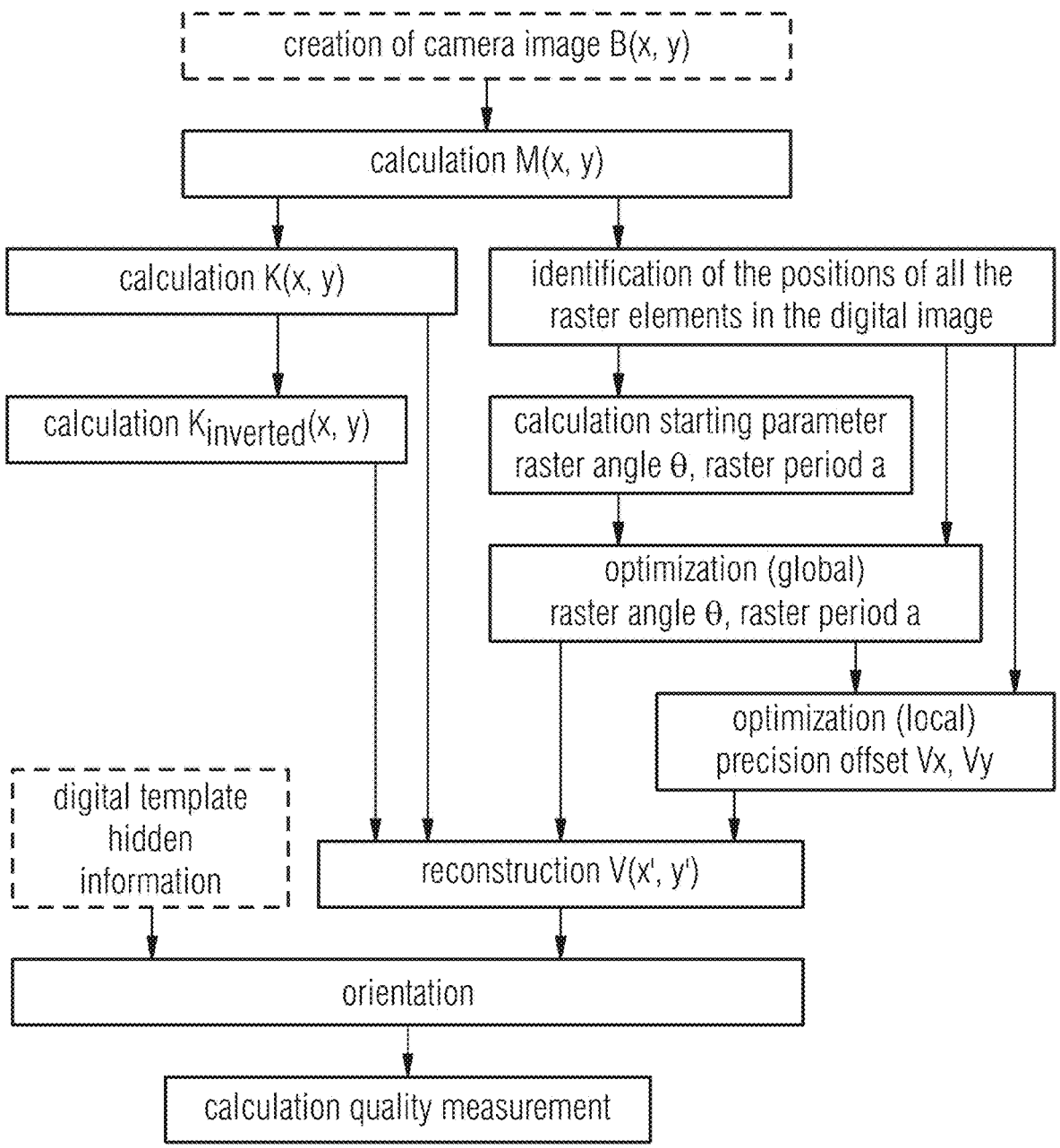
FIG. 21 is a flow chart for an alternative embodiment of the method, used for displaying or disclosing the hidden information from FIG. 18C.

FIG. 21 shows a flow chart in this regard; with regard to the method steps contained in it, reference is made to the explanations regarding FIG. 15. In deviation from FIG. 15, some method steps are modified as follows, because here, the goal of the following first (varied) implementation of the method consists in display or disclosure of the hidden information 4 (FIG. 18C).

Smoothing of the photographed digital image takes place in accordance with the function that has already been introduced $$M(x,y)=\frac{1}{9}*\Sigma_{(i=-1,0,+1,\ j=-1,0,+1)}B(x+i,\ y+j),$$

and reconstruction of the raster 5 (i.e. at first only of the positions of the raster elements 15, but not yet of their size, brightness and/or color) takes place, to a great extent, as explained using FIGS. 5 to 9 and 11. First of all, it should be noted that a suitable starting value for the parameter of the period length a can also be calculated (instead of estimated). Otherwise, (re)construction of the raster 5 takes place analogously, to a great extent (as does the prior determination of the position of the individual raster elements within the image surface of the digital image 6).

Figure 19A:
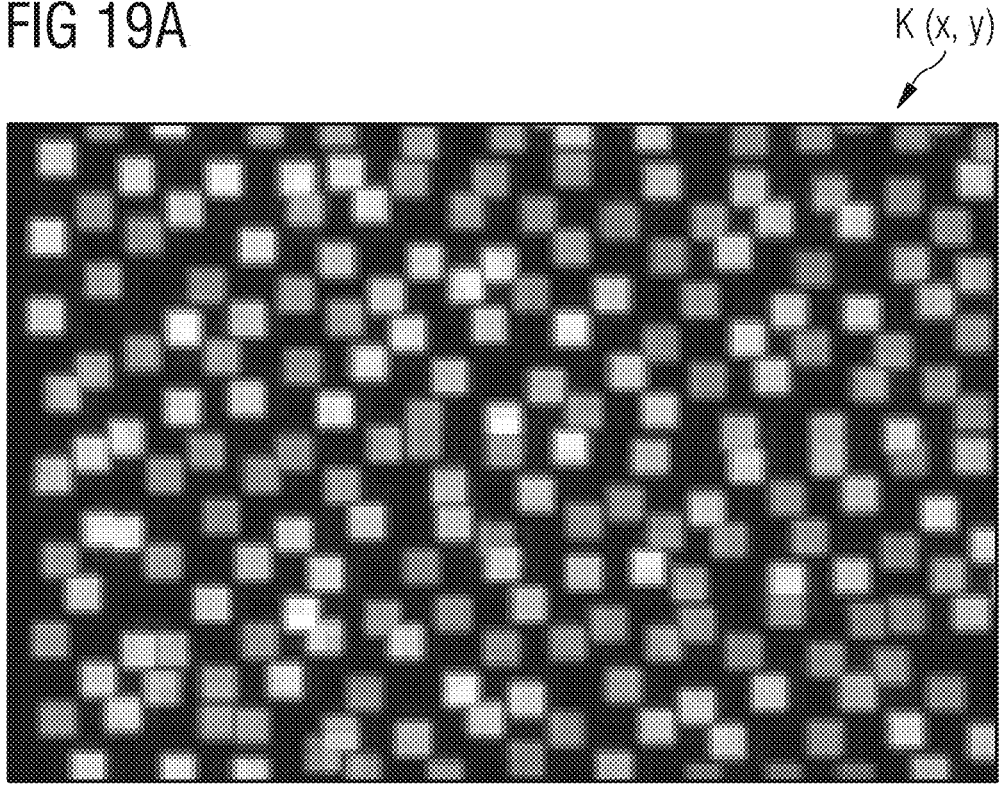
FIGS. 19A and 19B are derived digital images, alternative to FIGS. 10A and 10B, for representing the calculated contrast and the inverted contrast.
Figure 19B:
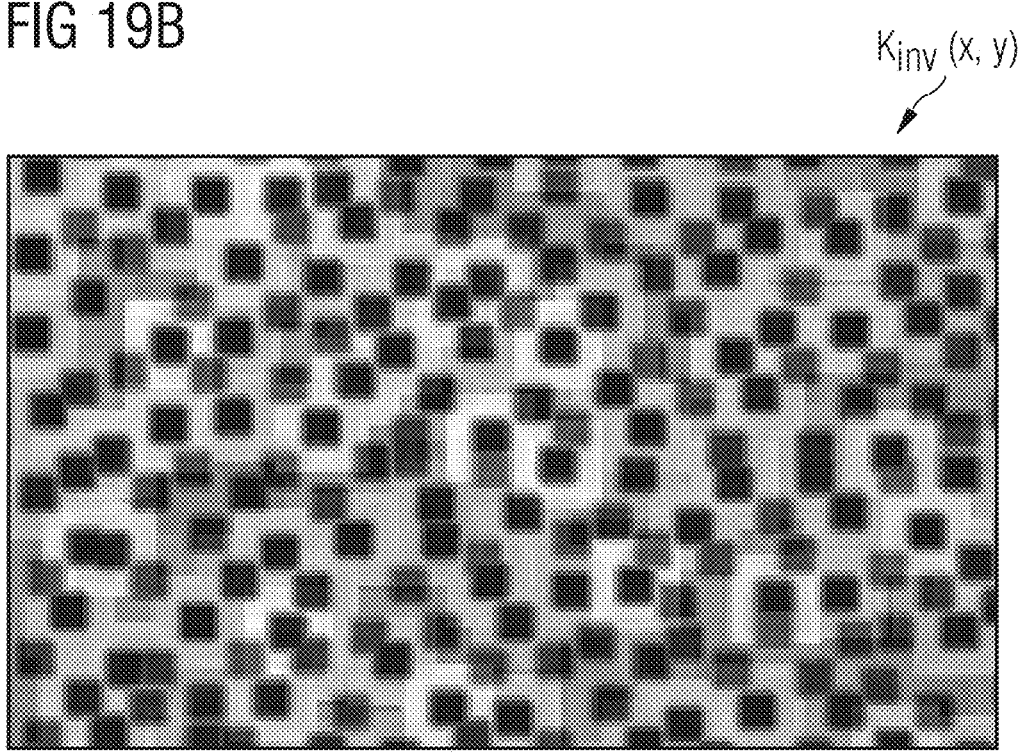

Furthermore, parallel or in addition, both the contrast according to $$K(x,y)=\text{MAX}_{(i,j=-3\ \ldots\ +3)}(M(x+i,\ y+j))-\text{MIN}_{(k,l=-2\ \ldots\ +2)}(M(x+k,\ y+l))$$

and the inverted contrast $K_{inv}(x,y)$ according to $$K_{inv}(x,y)=2*MW(\text{MIN}_{(i,j=-6\ \ldots\ +6)}(K(x+i,\ y+j));\ \text{MAX}_{(i,j=-6\ \ldots\ +6)}(K(x+i,\ y+j)))-K(x,y)$$

are calculated from the (smoothed) image M(x,y) in accordance with the formulas that are already known; this can be done before, during or after reconstruction of the raster 5. The images for K(x,y) and $K_{inv}(x,y)$ obtained in this manner are shown in FIGS. 19A and 19B.

Finally, because the goal here is to display the hidden information 4 (FIG. 18C) or to make it visible, instead of $$V_2(x',y')=\text{MAX}(K_2(x,y);\ K_{2,inv}(x,y)),$$

the following selection function is defined:

$$V(x',y')=K(x,y),\ \text{if}\ x'+y'=2n\ \text{and}$$

$$V(x',y')=K_{inv}(x,y),\ \text{if}\ x'+y'=2n+1$$

(or vice versa), wherein V(x',y') selects either the contrast K(x,y) or the inverted contrast $K_{inv}(x,y)$, in each instance, depending on the position of the corresponding raster intersection point, specifically always alternately in the manner of a checkerboard when advancing to the adjacent base cell by a period length a further along one of two periodicity directions.

By means of the arrangement of unoccupied and occupied raster intersections (with and without a raster element), which is regular in the two partial surface regions 10, 20, in each instance, the above selection function V(x',y') brings about the result that in the one (for example the first) partial surface region 10, only the unoccupied raster intersections having a very low local gray-value contrast are selected, whereas in the other (for example the second) partial surface region 20, only the occupied raster intersections having a rather high local gray-value contrast (due to the raster element present there) are selected; there, the local gray-value contrast can at most still vary as the result of the different variation in sizes, brightness values and/or colors of these raster elements 15.

Figure 20A:
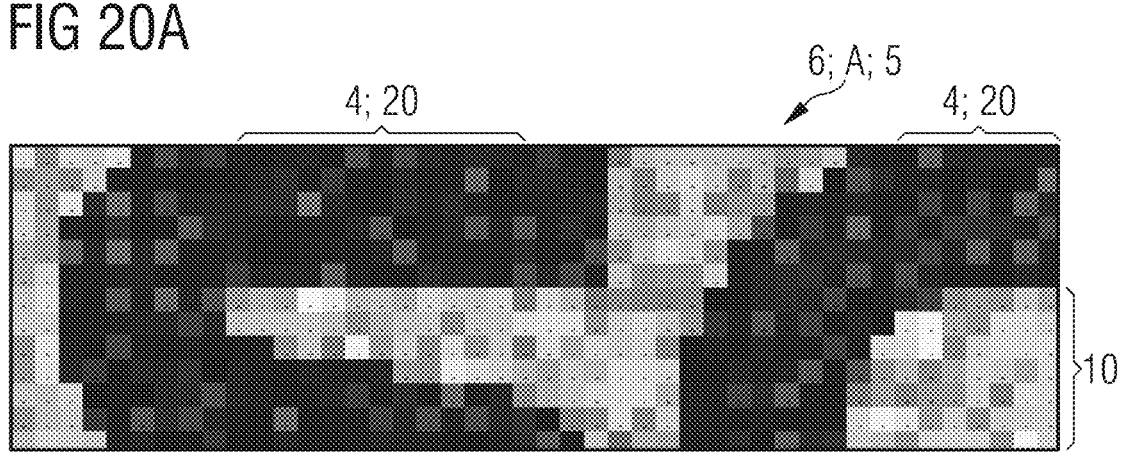
FIGS. 20A and 20B show information hidden as an example, shown in a reconstructed raster 5 and in a digital template that agrees with it.
Figure 20B:
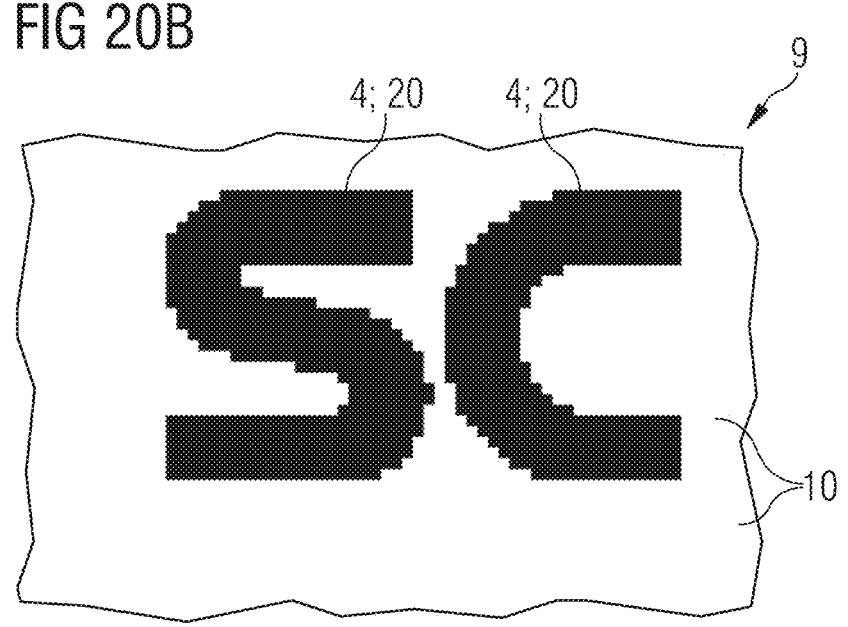

As a result, as is shown in FIG. 20A in the reconstructed raster 5 and, consistent with this reconstructed raster, in FIG. 20B in a corresponding digital template (for the surface expanse or contour 20a of the second partial surface region 20), the lettering comprising the letters "SC" occurs as the disclosed information 4; the hidden information in the form/contour 20a of the second partial surface region 20 is thereby reproduced with visual contrast relative to its surroundings, the first partial surface region 10.

Because in this modification of the method, merely this information 4 or "SC" had to be determined, creation of histograms or further processing is no longer required—unless the characteristic that was more strongly hidden, as explained using FIGS. 1 to 15, were additionally still contained in the same raster 101, 102 on the object 100 on the basis of the variation in sizes/brightness values/colors of the raster elements 15. Anyone who has determined the hidden information 4 as a forger or imitator, however, will not easily suspect a further additional characteristic (particularly one composed of two merely slightly varied printed dot sizes or brightness values and/or colors) in the same raster. Therefore, the ease of finding the information 4 will therefore distract the attention of the imitator, with not insignificant probability, from the actual security feature that is directed at a variation of printed dot sizes, printed dot brightness values or, if applicable, both of these variations.

The additional security feature (which is preferably intended for distraction) can also be any desired other security feature—instead of the occupation inversion with raster elements in accordance with FIGS. 18A to 21.

When the additional security feature directed at occupation inversion or another security feature has been made visible using the method explained using FIGS. 18A to 21, subsequently the actual method explained using FIGS. 1 to 15 can be carried out for statistical checking of the distribution of the sizes, brightness values and/or colors of the existing raster elements 15.

Figure 22:
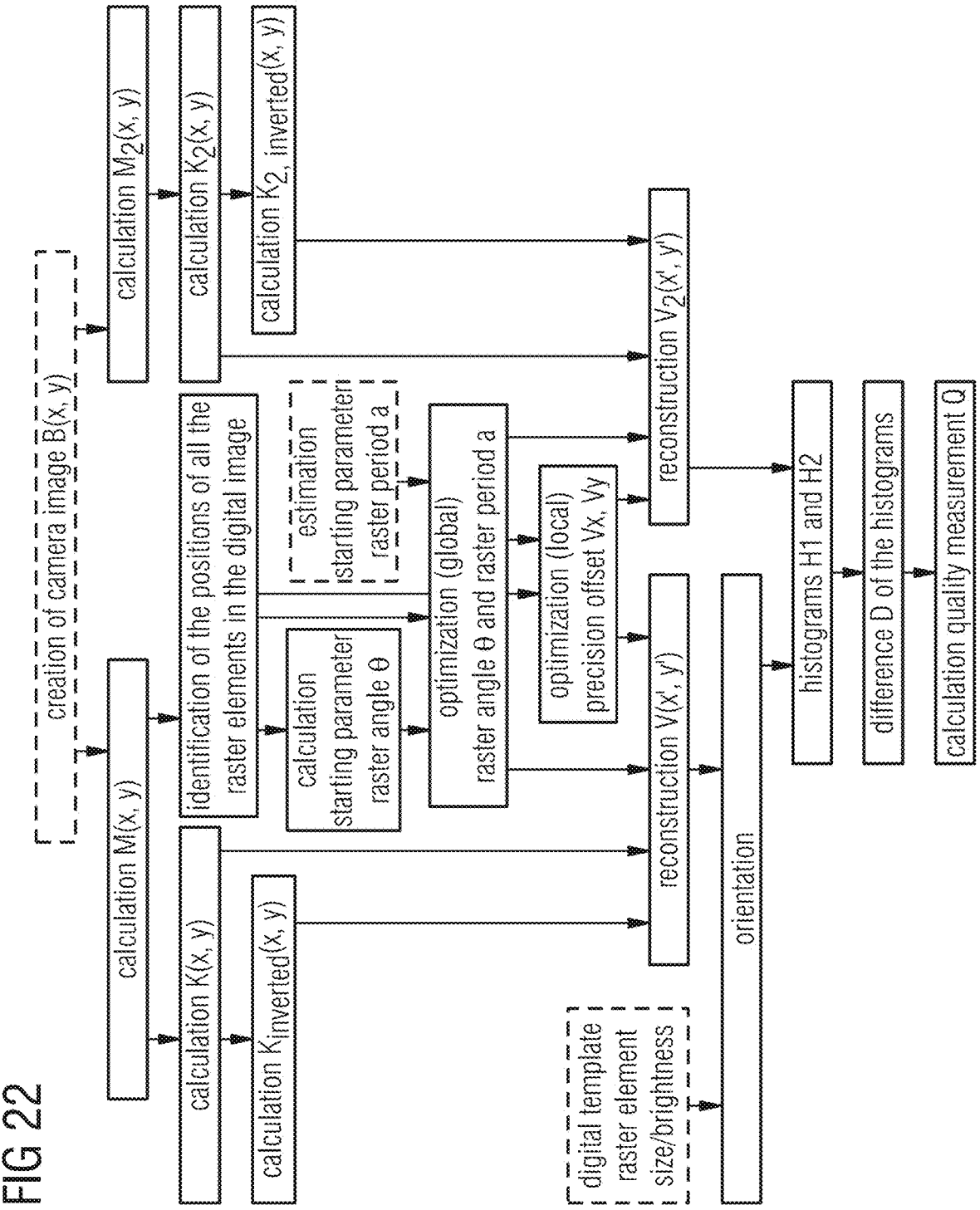
FIG. 22 is a flow chart for an embodiment of the method, which combines the partial methods according to the flow charts of FIGS. 15 and 21 with one another.

Therefore, the two methods can be combined with one another and can be carried out in parallel, simultaneously or one after the other. A flow chart for carrying out the two (partial) methods in combination, as an example, is shown in FIG. 22. In this regard, the point of departure is that first the additional security feature explained in accordance with FIGS. 18A to 21, for example, or some other (additional) security feature is uncovered; then the reconstruction of the raster 5—for example—will already be carried out within the scope of uncovering this additional security feature; then the raster 5 that has already been reconstructed will also be used for the evaluation of the distribution of the sizes, brightness values and/or colors of the raster elements 15.

The method proposed by the invention—whether it is for evaluation of the variation in sizes, colors and/or brightness values of the raster elements 15 or for uncovering an occupation inversion or some other additional security feature—makes it possible to photograph a security feature (in the form of hidden information) and to check it with regard to its authenticity, for example using a smartphone. The security feature is structured as a design of the raster 5 that cannot be perceived directly and, in particular, coded as a variation within a rasterization.

The above security features can easily be integrated into any desired graphical or visual surface designs of printed or other rasters, and do not require any additional room on the surface 100a of objects 100.

The methods described by the invention are also robust, i.e. non-critical with regard to the following influences:
- the demands that might exist on the part of a smartphone with regard to the printing quality of a printed image or other image motif photographed using the camera of a smartphone (for example with regard to image resolution, sharpness and/or gray-value contrast),
- the reproducibility of the printing quality, in particular the reproducibility of the relative position of the different raster elements relative to one another;
- the optical density and/or the gray-value contrast of the printed image, also in comparison to the visual background,
- the quality achieved, on the manufacturer side, of the digital image that can be produced using a smartphone and/or its camera, in particular taking into consideration the many different available smartphone models,
- the contrast, the lighting, the image brightness, the tone-value curve, the image sharpness, the image resolution, the photographing distance, the photographing center and the photographing rotation or the angle of twist of the raster (it is true that these properties must sometimes lie within generous limits, but no particular requirements are linked with them).

Therefore, the method presented for reconstruction of hidden information or for checking a security feature is particularly user-friendly, because no hard requirements or restrictions exist with regard to the manner of creating the photograph using the smartphone or other picture-taking device or the image quality.

The methods presented for determining security features are not dependent on any specific software or app for producing the digital image. Production of a digital image does not require any kind of special interaction; it is not necessary to display a particular region, and image resolution and/or image brightness do not have to be controlled to a greater extent than already occurs in usual smartphone or camera apps and the auto-focus and auto-lighting modes available for them.

The methods described by the invention can be carried out by testing personnel independently, using a digital image produced using a smartphone, and by means of subsequent uploading of this smartphone photograph (for example to a server on the Internet, on which this photograph is then evaluated); in particular it is not necessary to check the security features using an app or a separate checking program. No additional equipment is required for use of the proposed method, either, for example no special lighting device. Furthermore, the proposed method can, of course, also be carried out without connecting to or making use of a server.

Finally, visual designs of objects or the surfaces printed in any desired printing inks (black, red, green, etc., white on black, etc.) as well as using any desired printing methods (ink-jet printing, flexographic printing, screen printing, letterpress printing, gravure printing, etc.) can be reconstructed by means of the proposed method and checked for genuineness, as long as a raster composed of raster elements is contained therein, of which a digital replica can be produced and used for further investigation. The same holds true for labeling or processing methods alternative to printing methods, such as, for example, punching, embossing, laser cutting, laser labeling or the like.

Instead of an orthogonal raster, it is also possible to use any other, for example non-orthogonal raster (with different angles between the two axes or periodicity directions); also, the base cells of the underlying raster do not need to be either square or rectangular. If necessary, determination of the starting parameters would be modified for the raster angle, but these starting parameters could also be determined, for example, by means of determining the orientation of some other graphic element.

In view of the three color channels red, green, and blue of a smartphone, the investigations could be carried out jointly or simultaneously, but separately for each color channel and thereby independent of the other color channels, so that a hidden motif can be determined by means of each of the color channels.

According to a further development, the method explained using FIGS. 18A to 21, for uncovering a further or additional security feature, can be used, in particular, for determining a "seed," a starting value and/or a key as hidden information 4 or as another result of a first pass of a first partial method, which contains reconstruction of the raster 5, which seed, value or key is subsequently needed to carry out a second (partial) method, in particular a "seed," i.e. a (hidden) starting value that has to be input into a pseudo-random number generator so as to determine a predefined distribution of the size, brightness and/or color of raster elements of raster 5, which was used in the production of a visual design (present as a printed or otherwise physically configured raster on the object 100) (or is reproduced as a replica in the digital image 6 by means of photographing or scanning it).

Thus, in the calculation of the print template (or of a digital template 9) to be produced, proceeding from any desired, variably structured first hidden information 4, the pseudo-random pattern for the print template can be produced, and on the basis of this pattern, the print template can be calculated and printed.

In the case of the evaluation method (for example according to FIG. 22), the first hidden information 4 can first be read out by means of a first partial evaluation method (as explained using FIGS. 18 to 21), and based on this information (i.e. using this information as a "seed"), the pseudo-random pattern for the variation in size, brightness and/or color of the raster elements 15a, 15b can be produced (which variation is hidden and must be found), and investigation of the pattern with regard to this variation in size, brightness and/or color of the raster elements 15a, 15b is carried out using this information, i.e. as explained using FIGS. 1 to 15 or at least using the still missing method steps for the complete process flow or process sequence according to FIG. 22.

This further development for production of a seed formed from a specific character chain or character sequence (for example an alphanumeric character sequence) for generating the pseudo-random number function can be carried out, as an example, according to $$\text{Seed}_n = (\text{Seed}_{n-1} + 1) * \text{Character}_n \bmod 1{,}000{,}000{,}000$$

with $\text{Seed}_0 = 0$. In this regard, proceeding from the value $\text{Seed}_0 = 0$, every character of the character chain is iteratively multiplied by the prior seed, one after the other, wherein 1 is added to the prior seed, in each instance. In this regard, "mod" refers to the function that represents the remainder of a whole-number division, and $\text{Character}_n$ represents a code for the $n^{th}$ character of the character chain (starting with the index 1), in the form of a whole number, for example the ASCII Code. With 100,000 trial character chains, each of which consists of 15 alphanumeric characters (information content 75 bits), practically no double seeds are generated using this method.

It is an advantage of this further development that using such seeds, it is possible to form printed copies individually or differently (and thereby as a unique item), namely with a different, individually hidden information 4, in each instance (which is to be disclosed with regard to the occupation inversion), from which information a seed that is practically just as individual can be calculated, in each instance, and accordingly, a likewise individual distribution of the sizes, brightness values and/or colors of the raster elements is formed.

In this method, no access to an external or centrally stored database is required so as to verify the genuineness of an object or of its identification 101, 102, structured as a pattern or raster, because the information 4 regarding what the (authentic) identification 101, 102, constructed as a unique item, looks like, is stored or contained in the first hidden information 4 and/or can be derived from it. At the same time, the actually underlying print template can be produced, using the required additional knowledge. The two-stage combination security feature formed from the two security features can be independently checked and thereby allows what is called "self-authentication."

Because, in this regard, a different, separate and individual pseudo-random number function can now be used for each individual printed pattern (even in the case of the same motif or other appearance), instead of a single predefined pseudo-random number function that is valid for many objects, the security level increases significantly; it is true that experimental reconstruction of the pseudo-random number function would be possible theoretically, but it could be used only for a single, very concrete example of an object.

FIGS. 23A to 23D show a further development relating to the combined method according to FIG. 22, in which a variation of the raster element sizes, colors and/or brightness values is to be reconstructed as an actual security feature (wherein here, as an example, an exclusive variation of the brightness values of the raster elements 15 is shown and described), and furthermore a hidden information 4 must be determined, which is supposed to distract from the actual security feature of the brightness variation.

Figure 23A:
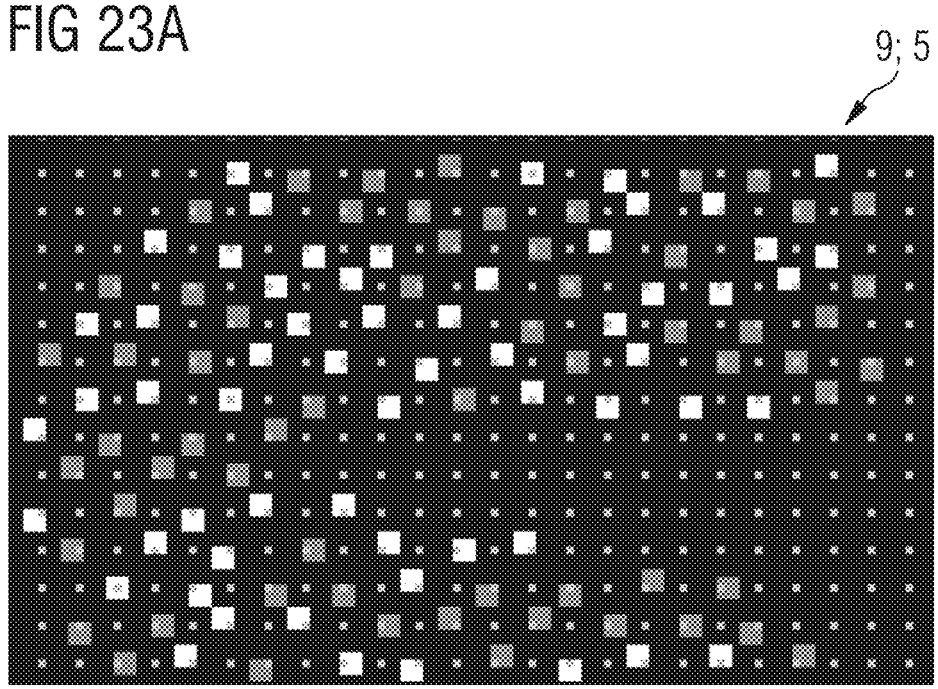
FIGS. 23A to 23D show a further development of the method, using the example of the combined method according to FIG. 22, in which hidden information is determined, using which information the distribution of different nominal values for the sizes, brightness values and/or colors of the raster elements can be disclosed.
Figure 23B:
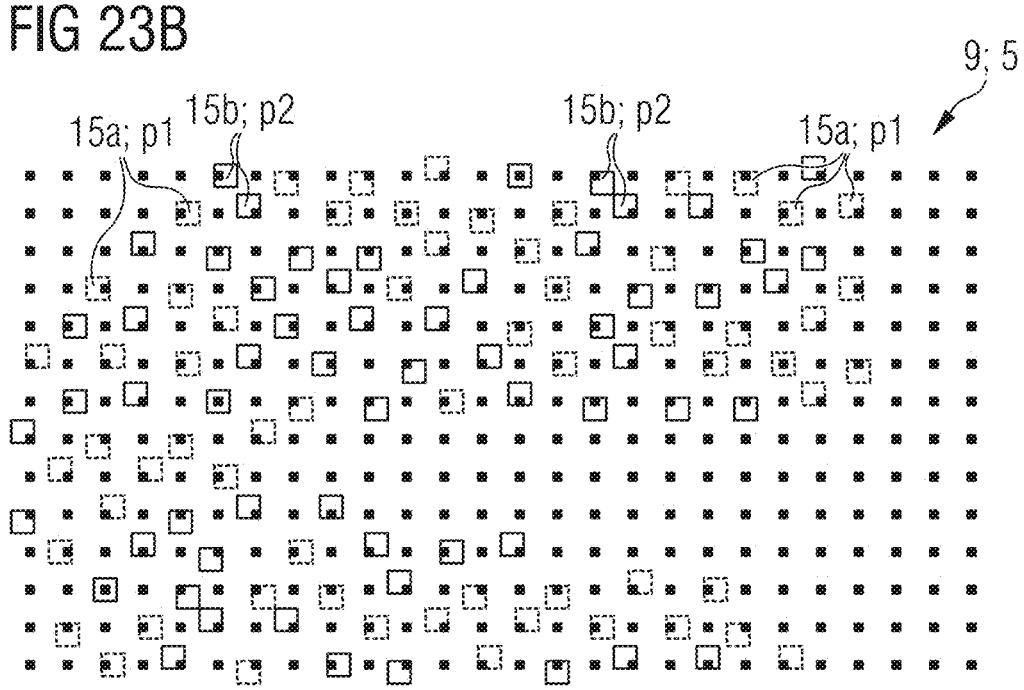

FIGS. 23A and 23B show a brightness distribution, as an example, in the region of the motif, which here is formed as the upper half of the letter "S" (and can serve as hidden information or a component of it) for the digital template 9 of a predefined raster 5 (which is to be reconstructed again during evaluation of the photographed digital image of the printed copy on the object).

FIGS. 23A and 23B show the positions of the raster intersections or center points of the base cells of the raster 5 as small squares, arranged without offset (gray in FIG. 23A; black in FIG. 23B).

Furthermore, the raster elements 15a, 15b predefined in two different brightness values p1, p2 are shown (outlined in FIG. 23B), but for easier comprehension, at first shown only within the surface region of a motif (i.e. in the second partial surface region 20) (and not shown outside of it).

Figure 16:
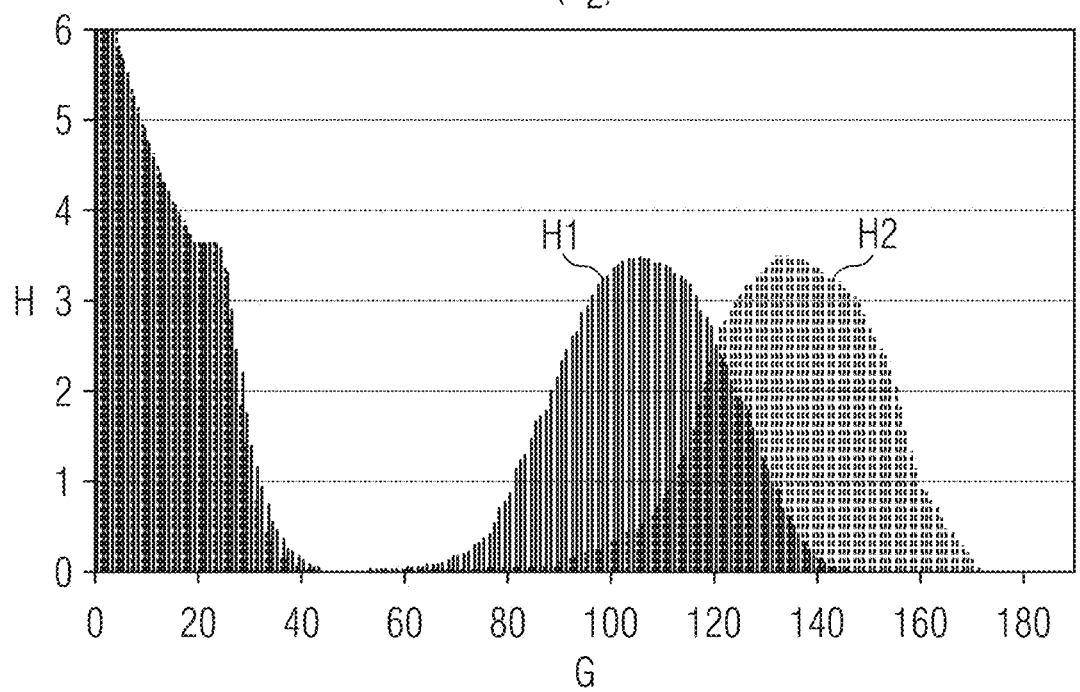
FIGS. 16 and 17 are histograms according to FIG. 13, in each instance, but calculated either from the contrast or from the inverted contrast.
Figure 17:
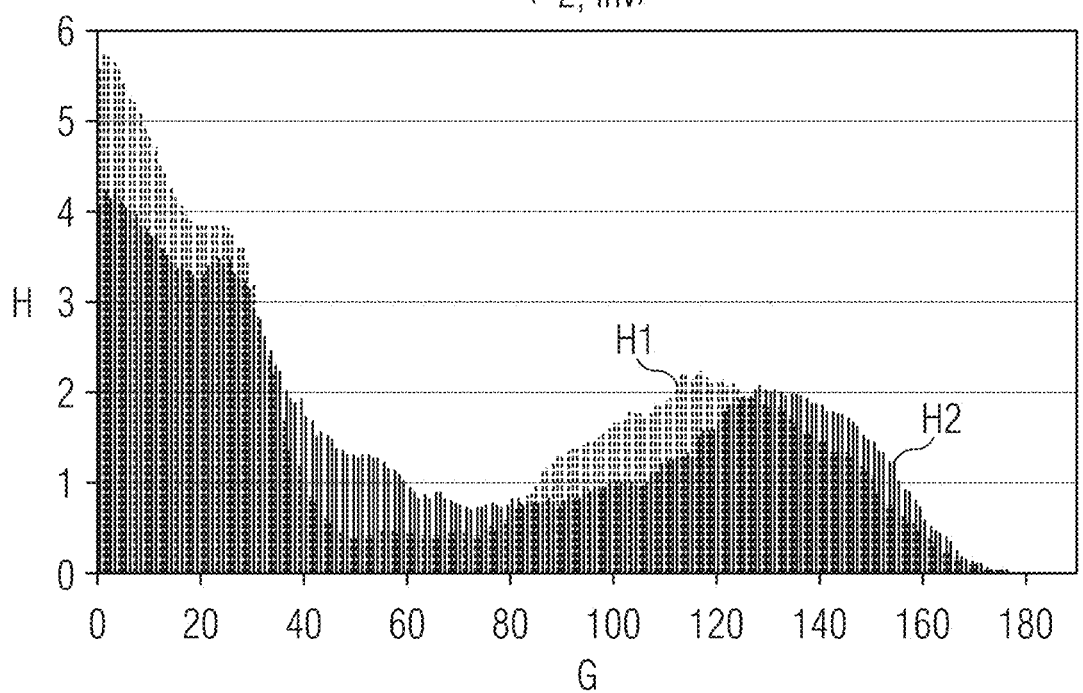

In the embodiment explained using FIGS. 1 to 15 (and analogously according to FIG. 22), the histograms H1, H2 were created from the comparison image $V_2(x,y)$, which, as a function of position, has selected the maximum, i.e. the greater gray-value contrast value, in each instance, in the digital images for the contrast $K_2(x,y)$ and the inverted contrast $K_{2,inv}(x,y)$, and combined them in the image $V_2(x,y)$. If the histograms H1 and H2 are calculated, for example, not using the maximum selection function $$V_2(x',y')=\text{MAX}(K_2(x,y); K_{2,inv}(x,y)),$$

but rather exclusively from the contrast image $K_2(x,y)$ or exclusively from its inverse image $K_{2,inv}(x,y)$ (after brightness inversion of all the gray-value contrast values), then the (smoothed) histograms of FIGS. 16 and 17 are formed. The raster used—as can already be seen in FIGS. 4, 10A and 10B, was not a fully filled raster, but rather one with empty spaces on every second raster intersection, on average—as can be seen from the dark remaining surfaces between the square, medium-bright and/or even brighter regions of the contrast image $K_2(x,y)$ in FIG. 10A.

The three main brightness values in FIG. 10A, each of which represents a specific size order of the local gray-value contrast, correspond to the two "bulges" for H1 and H2 in FIG. 16, which are offset from one another, as well as to a low-contrast background noise signal having low gray-value contrast values, caused by the large, almost black and, in particular, homogeneous surface regions in FIG. 10A, which represent the gaps between raster elements and thereby unoccupied base cells. The "bulges" for H1 and H2 positioned at two high gray-value contrast values G result from raster intersections occupied by raster elements. FIG. 17B, derived from $K_{2,inv}(x,y)$ (FIG. 10B), in contrast no longer shows any raster element signals of any kind, but rather only results from empty raster intersections without a raster element or without a printed dot, and practically represents an average of the gray-value contrasts of the surrounding raster elements; the almost contrast-free (white or bright) regions of the marked surface of the document, label or other object possess high brightness values in the inverted contrast image in 10B, which—even after correct assignment and subsequent distribution over the two portions or histograms H1 and H2—no longer show a clear jump between two different gray-value contrast values G; this appearance is a visual background signal. The printed pattern that forms the basis of FIG. 10A and thereby also of FIG. 16 was printed using black printing ink, and accordingly has particularly great contrast, i.e. gray-value contrast, so as to represent the method according to the invention in the best possible manner, as an example. In general, however, it is also possible to use inks having a clearly weaker gray-value contrast. Then, however, the frequency distributions for H1 and the background signal of the gaps that lie between raster elements (i.e. unoccupied base cells) are superimposed, at least in part, and this arrangement makes statistically clean evaluation difficult or even impossible. Creation of the histograms H1 and H2 using the maximum selection function $$V_2(x',y')=\text{MAX}(K_2(x,y); K_{2,inv}(x,y))$$

therefore eliminates the undesirable influence of the gaps between the raster cells (or the unoccupied base cells) on the histogram, wherein this elimination is achieved at the cost of the influence of the greater gray-value contrast values of the inverted contrast $K_{2,inv}(x,y)$ (FIG. 17), but these values, as has already been mentioned, represent an average of the gray-value contrasts of the surrounding raster elements and therefore can be viewed as being almost constant, at least statistically.

The further development of FIGS. 23A to 25B serves for eliminating the effects of the disruptive dark background in a different way.

For this purpose, it is proposed to evaluate the aforementioned gray-value contrast values of exclusively those raster intersections (or the center points of those base cells) that are occupied by a printed dot, i.e. raster element 15. In FIG. 23A and 23B, these occupied raster intersections (in the upper curve of the letter "S" that is shown) are arranged within one of the square raster elements 15a, 15b that are shown three times as large (and thereby in a size of 3×3 sub-cells). The related brightness p1, p2 of the respective raster elements 15a, 15b is shown in FIG. 23B in the form of the type of line of the frame.

Those raster intersections that are not occupied by a printed dot (i.e. in the letter "S" in FIG. 23A, not covered by a raster element 15a, 15b) are not supposed to be evaluated, because they carry no information.

Figure 23C:
Figure 23D:
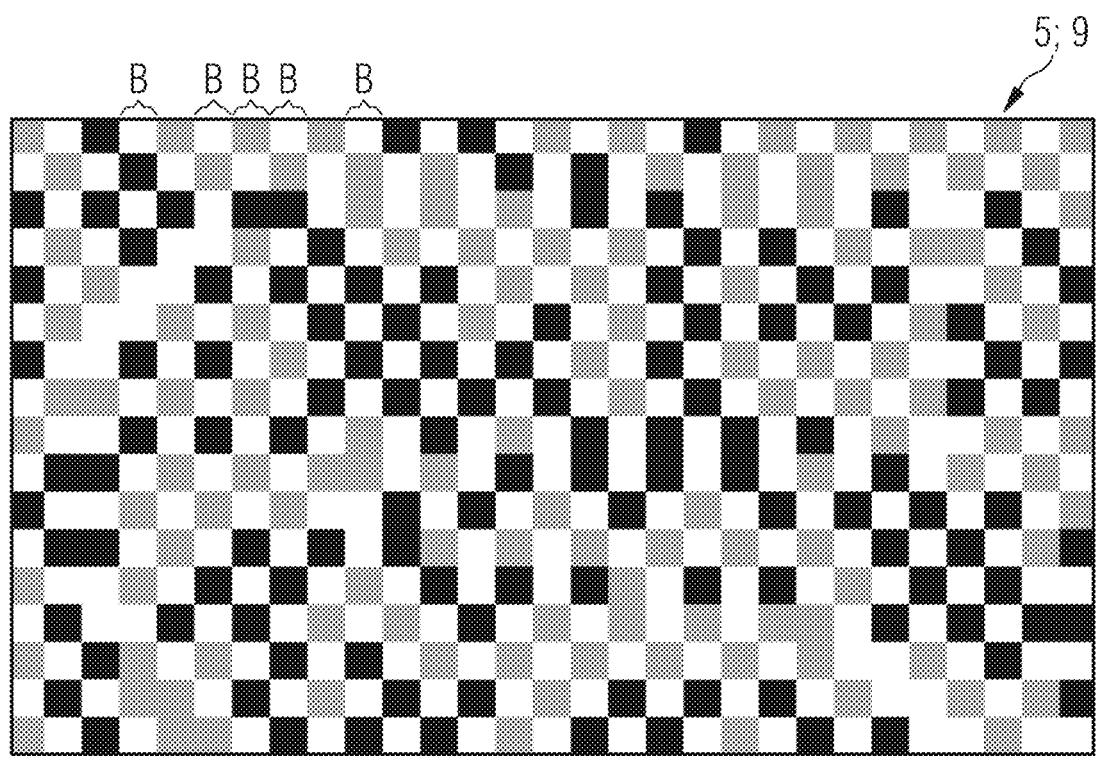

FIGS. 23C and 23D show the same region of the pre-defined pattern 5 or of the digital template 9, but with the difference that now, only the base cells B are shown.

In accordance with the idea of evaluating only those raster intersections (or the center points of those base cells) that are occupied by a printed dot, i.e. a raster element 15, for the creation of the histograms or of the statistical gray value distributions, therefore those base cells B that are not white must be selectively selected in FIG. 23C.

FIG. 23C shows this selective cell selection, in simplified form, for only the motif region 20; the complete selective selection that must actually be undertaken, of all occupied cells B, is evident from FIG. 23D. In FIG. 23D it can be sensed where the boundary between the two partial surface regions 10, 20 runs; there, either two occupied base cells (black or gray) or two unoccupied base cells (white) border on one another, in each instance. In the visual motif region, i.e. the second partial surface region 20, the raster positions of the base cells B to be selected are offset by precisely one period (or displaced by one base cell, in the manner of a checkerboard) relative to the raster positions that would have to be selected if this surface region still belonged to the first partial surface regions 10.

If the selective selection described above is undertaken exclusively with regard to the occupied base cells, recognizable differences occur, as can be seen in FIGS. 24A to 25B.

Figure 24A:
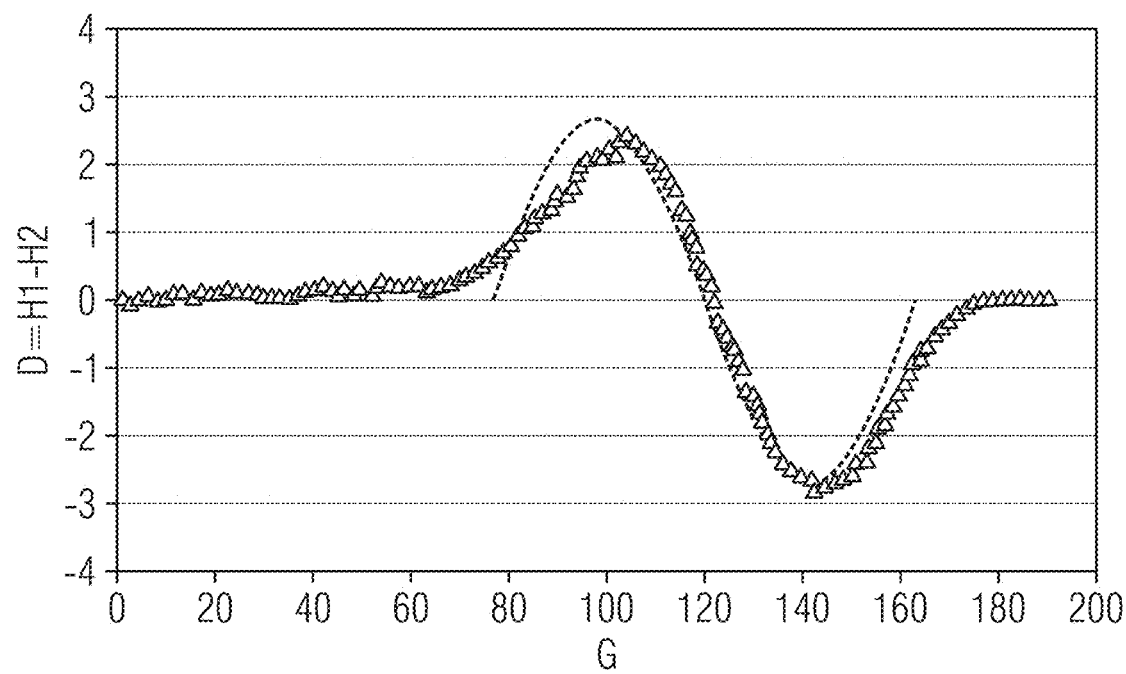
FIGS. 24A and 24B show the improvement with regard to the difference histogram, analogous to FIG. 14, as the result of the further development according to FIGS. 23A to 23D.
Figure 24B:
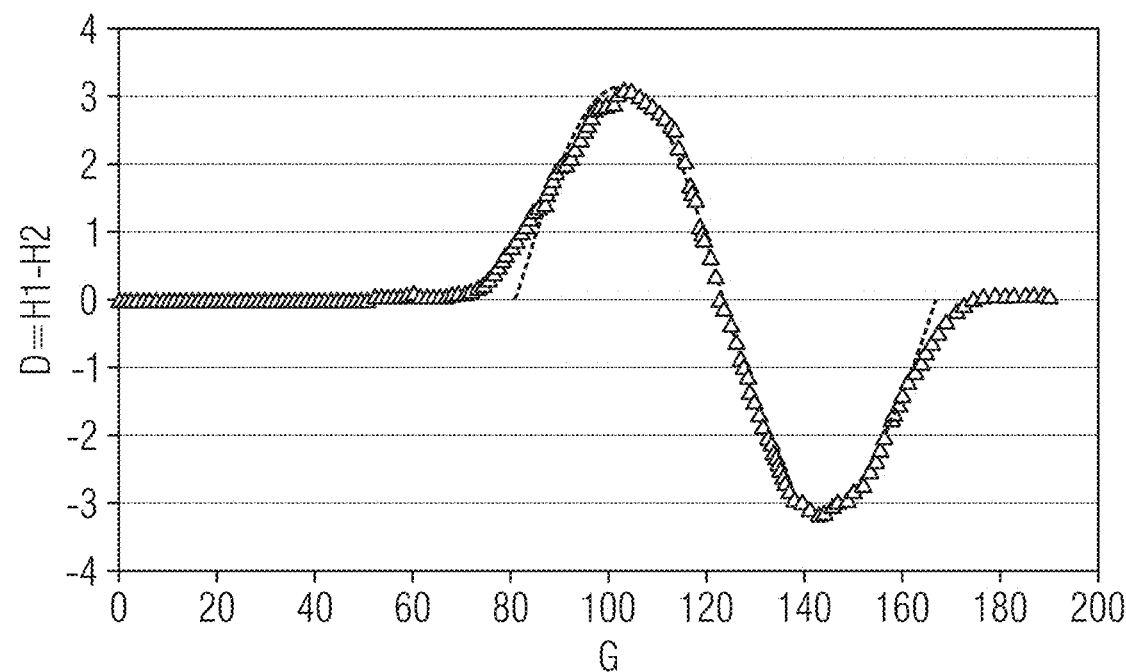

FIGS. 24A and 24B show the difference histograms D=H1−H2, specifically in FIG. 24A when taking all of the base cells into consideration (i.e. without a selective selection) and in FIG. 24B when exclusively taking the selectively selected, in other words occupied base cells (or raster intersection points) into consideration. The lateral offshoots of the difference histogram D in FIG. 24A lead to lesser "filling" of the bulges of the fit function (which once again is structured as a sine function, because the occupied base cells are occupied at a ratio of 50:50, i.e. statistically half of each by brighter raster elements 15a having the brightness p1 and by darker raster elements 15b having the brightness p2) and at a fit proportion of 71% (which flows into the calculation of the quality measurement).

In FIG. 24B, based on taking into consideration exclusively the occupied base cells (and ignoring the unoccupied base cells), in contrast, more complete "filling" of the bulges of the sine function can be seen, and the offshoots laterally outside of the sine period are also smaller. The fit proportion for calculation of the quality measurement amounts to 85% here.

Figure 25A:
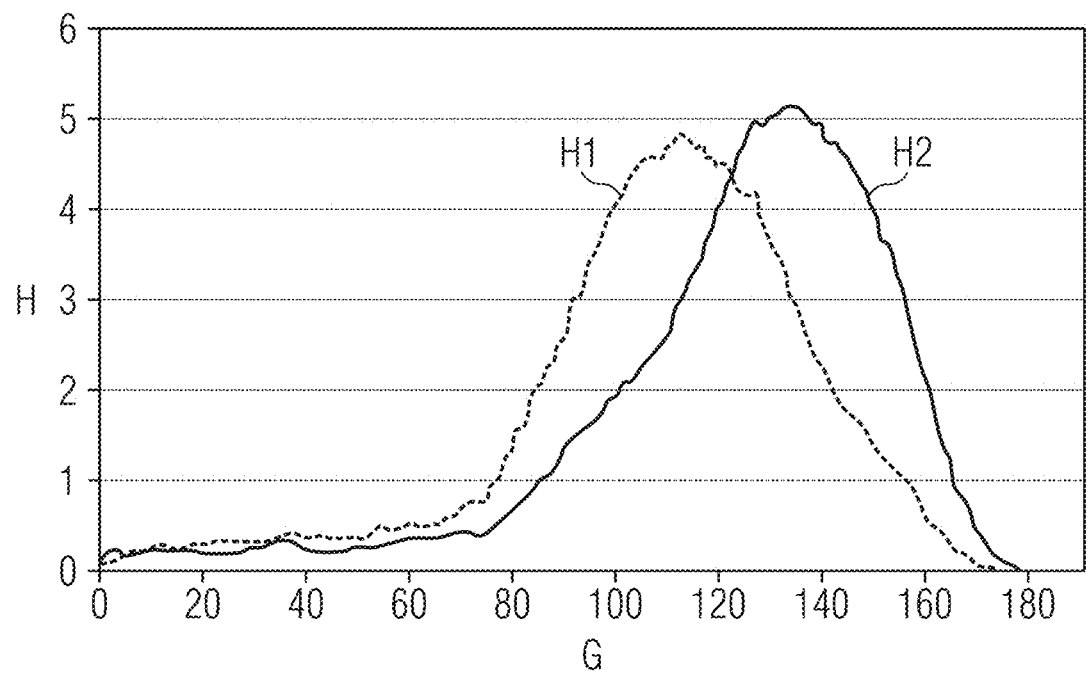
FIGS. 25A and 25B show the improvement with regard to the individual histograms assigned to the different nominal values of the sizes, brightness values and/or colors of the raster elements, analogous to FIG. 13, as the result of the further development according to FIGS. 23A to 23D.
Figure 25B:
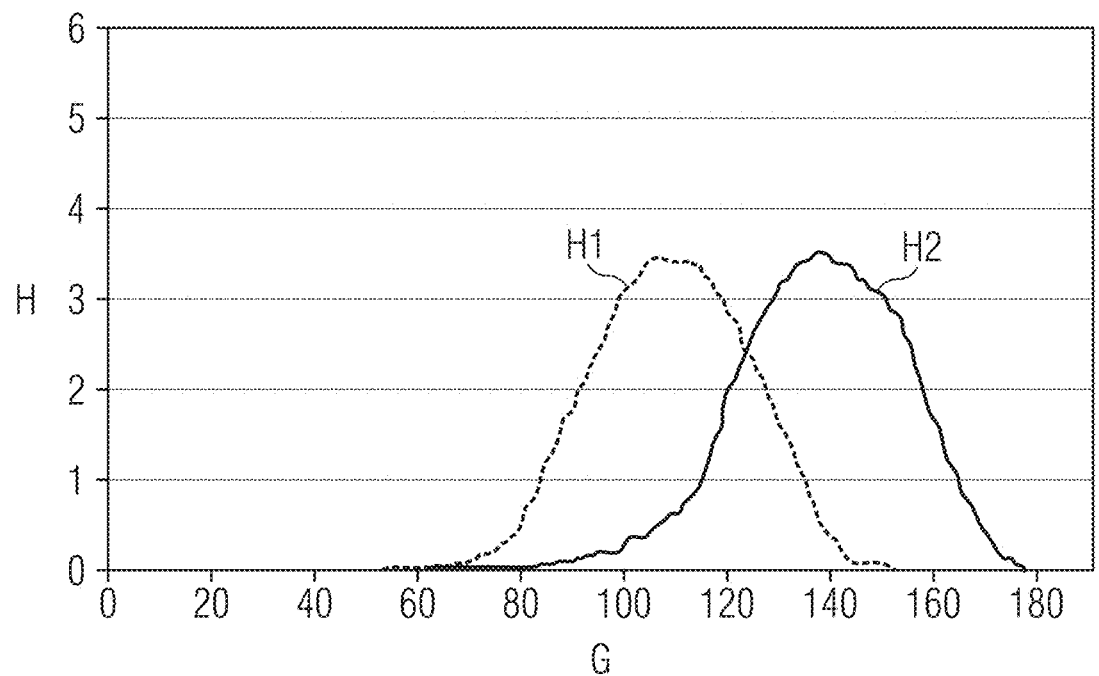

FIGS. 25A and 25B show the related individual (smoothed) histograms H1 and H2, specifically analogously in FIG. 25A, taking all of the base cells into consideration, without a selective selection, and in FIG. 25B, with a selective selection of the occupied base cells or raster intersection points. In comparison to FIG. 25A, in FIG. 25B the two frequency maximums for H1 and H2 lie farther apart, overlap less, and have more similar maximum values.

By means of the selective selection of occupied base cells B for calculation of the quality measurement, in FIG. 25B the noise is practically completely eliminated for the (averaged) gray-value contrast levels G in the value range between 20 and 80.

In general, it is not necessary for the evaluation for the digital template for the visual motif 20 to be present. In contrast, implementation of this advantageous further development is always possible if, in the reconstruction of the raster 5, the printed template or digital template 9, including the visual motif 20, is available or can be produced.

The invention furthermore makes available an object 100, the surface 100a of which contains an imprinted raster 5 or one formed in some other way, and carries a particularly secure coded security feature 102 within it. The raster 5 formed from a plurality of raster elements 15; 15a, 15b comprises not only a first security feature, which is coded by means of the arrangement, position and/or distribution of the plurality of raster elements 15 in the raster 5, but furthermore also at least a second security feature, which is coded by means of at least one parameter of the raster elements 15; 15a, 15b, wherein the at least one parameter comprises the size, the brightness and/or the color of the raster elements 15; 15a; 15b.

This actual, second security feature is superimposed as a (comparatively less noticeable) variation of the raster elements themselves on the first security feature, which is directed at the arrangement, positioning and/or distribution of these raster elements and therefore can be more easily perceived.

Preferably, the second security feature is coded in that the raster elements 15 can be assigned, at least statistically, to two groups of differently structured raster elements 15a; 15b, wherein a first group of raster elements 15a is configured according to a first parameter value p1 and a second group of raster elements 15b is configured according to a second parameter value p2, each of which values corresponds to two or more different nominal values for the size, the brightness and/or the color of the raster elements 15; 15a; 15b.

The first, more noticeable security feature, in contrast, can be coded as a distribution of occupation numbers on the base cells B of the raster 5 and/or as a distribution of decenterings and/or displacements of the raster elements 15 relative to the center point of their respective base cells. Such distributions can be optionally selected in pseudo-random or deterministic manner; in addition, they are superimposed, in the raster or pattern on the object surface 100a, by the second security feature (for example by differently dark or large raster elements).

In the raster 5 on the object surface 100a, the raster elements 15 are preferably each individual printed dots that cannot be further subdivided visually, i.e. elementary surfaces that cannot be further subdivided visually, which are produced using the printing technique or other processing technique used for visual structuring of the surface 100a. Alternatively, the raster elements 15 themselves can be aggregates composed of a corresponding plurality and/or multiplicity of printed dots, i.e. of many elementary surfaces of the aggregates produced using the printing technique or processing technique used for processing. The object can be, for example, a label, a packaging or a housing, a container, a document, a tool part or machine part or any desired other object, for example one that must be checked with regard to its authenticity and/or genuineness.

What is claimed is:

1. A method for checking a surface of an object imprinted or structured in raster form, the method comprising:
   (a) performing a step (a) comprising creating, making available, or using a digital image reproducing a replica of the surface of the object;
   (b) performing a step (b) comprising checking or determining a property of the surface using the digital image or the replica reproduced in the digital image;
   c) performing a step (c) comprising outputting a checking result or a determination result with reference to the property;
   wherein step (b) further comprises construction or reconsutrction of a raster comprising a plurality of raster elements using the digital image or the replica reproduced in the digital image;
   wherein the construction or the reconstruction of the raster is carried out so that at least one parameter of the raster elements can assume at least two differently large parameter values depending on a position of a corresponding raster element in the raster;
   wherein the at least one parameter comprises a size of the raster elements, a brightness of the raster elements, or a color of the raster elements; and
   wherein the checking result or the determination result output in step (c) is provided by checking or determining the property as a function of the at least two differently large parameter values or as a function of a distribution of the at least two differently large parameter values on the raster elements of the raster.

2. The method according to claim 1, wherein for each parameter value of the at least two differently large parameter values, a statistical distribution of actual sizes, brightness values or colors determined from the digital image or from the replica is calculated from the raster elements of the raster constructed or reconstructed, to positions assigned to a corresponding parameter value.

3. The method according to claim 2, wherein:
   for all the raster elements of the raster constructed or reconstructed, the actual size, brightness or color is determined;
   each raster element of the plurality of raster elements has an assigned nominal parameter value intended or predefined as a function of a position of the raster element within the raster constructed or reconstructed, for the position within the raster; and
   in each instance, for all the raster elements of the raster constructed or reconstructed having the assigned nominal parameter value, the actual sizes, brightness values or colors determined of the raster elements are combined in a separate statistical distribution assigned to the nominal parameter value or separated from statistical distributions that have been or are assigned to other nominal parameter values.

4. The method according to claim 1, wherein respective nominal parameter values for the size, brightness or color are assigned to the raster elements of the raster constructed or reconstructed:
   using a digital template;
   using a pseudo-random number function or some other generation algorihtm for generating a digital template; or
   using a pseudo-random number function or some other generation algorithm for assigning one of several parameter values that are different from one another, in each instance, to predefined raster elements of a predefined raster.

5. The method according to claim 1, wherein the raster elements of the raster constructed or reconstructed have respective nominal parameter values for a nominal size, a nominal brightness or a nominal color assigned to the raster elements;
   wherein the raster constructed or reconstructed is compared to a predefined raster that has been or is newly generated:
   by a digital template;
   by a pseudo-random function for generating a digital template; or
   by a pseudo-random function or some other generation algorithm for generating a predefined raster; and
   wherein the respective nominal parameter values assigned or to be assigned to a corresponding raster element of a predefined or generated or newly generated comparison raster, are assigned to a corresponding raster element of the raster constructed or reconstructed that possesses an identical position, within the raster constructed or reconstructed, as a corresponding raster element of the predefined comparison raster.

6. The method according to claim 1, wherein from the digital image or the replica reproduced in the digital image:
   a contrast image having a brightness reproducing an intensity of a local contrast in the digital image, and
   an inverted contrast image having a brightness reproducing an intensity of an inverted local contrast in the digital image, are generated; and
   values for an actual size, brightness or color of the raster elements of the raster constructed or reconstructed are determined from a derived digital image linking the contrast image and the inverted contrast image with one another.

7. The method according to claim 6, wherein for determination of an actual size, brightness or color of the raster elements of the raster constructed or reconstructed, the derived digital image is calculated, wherein the local brightness in the contrast image and the local brightness in the inverted contrast image are compared with one another and a greater brightness value, in each instance, is selected from the contrast image and the inverted contrast image.

8. The method according to claim 1,
   wherein a comparison function is calculated from statistical distributions of actual determined sizes, brightness values or colors of the raster elements that are assigned to different, predefined nominal parameter values;
   wherein the comparison function, over a band width of contrast levels or gray values for different contrast levels or gray values, compares related frequency values from the statistical distributions, in each instance, to one another or links the related frequency values with one another; and
   wherein the comparison function, for different contrast levels or gray values, compares at least a related frequency value from a statistical distribution, which is assigned to a first nominal parameter value, to a related frequency value from a statistical distribution assigned to a different, second nominal parameter value, or forms a difference from two frequency values, in each instance.

9. The method according to claim 8, wherein:
   a fit function is fitted to the comparison function or optimized to a greatest possible agreement with the comparison function to generate a fitted or optimized comparison function;
   the comparison function is compared to the fitted or optimized comparison function or an extent of agreement between the comparison function and the fitted or optimized comparison function is determined; and a quality measurement is output as the result with reference to the property of the surface from the comparison or from the extent of agreement so determined.

10. The method according to claim 8, wherein:

for precisely two different, predefined nominal parameter values for a size, a brightness or a color of raster elements, assigned statistical distributions of actual sizes, brightness values or colors are determined separately;

as a comparison function, a difference function is calculated, which, over a band width of contrast levels or gray values for different contrast levels or gray values, subtracts a related frequency value derived from the statistical distribution for the second nominal parameter value, in each instance, from the related frequency value derived from the statistical distribution for the first nominal parameter value; and as a fit function for fitting to the comparison function or optimization to a greatest possible agreement with the comparison function, a function that has a zero crossing at a contrast level or a gray value that lies centrally between two nominal parameter values is fitted or optimized.

11. The method according to claim 1, wherein the construction or reconstruction of the raster from the digital image or the replica reproduced in the digital image comprises first:

an angle of twist of a periodicity direction of the raster to be constructed or to be reconstructed, relative to a main direction of the digital image, and at least one period length of the raster to be constructed or to be reconstructed are determined jointly in a joint determination, with reciprocal dependence on one another without optimizing a total offset of the raster to be constructed or to be reconstructed, relative to the digital image; and only afterward, a lateral offset is optimized using result values determined for the angle of twist and for the period length, wherein using the lateral offset so optimized all the raster elements are brought into coverage with the generated raster.

12. The method according to claim 11, wherein the joint determination of the angle of twist and of the period length is carried out in such a manner that from the digital image or a partial region of the digital image, first:

a calculation is carried out for restricting a range of possible numerical values for an end result of the angle of twist, or a calculation is carried out for restricting a range of possible numerical values for an end result of the period length; and only after so restricting the angle of twist or the period length, the joint determination of final numerical values for the end result of the angle of twist and of the period length, with reciprocal dependence on one another, is carried out.

13. The method according to claim 1, wherein the digital image created, made available or used, reproduces a replica of a raster formed from raster elements of an imprinted or visually structured surface of the object;

wherein the digital image is built up from a plurality of digital pixels;

wherein the raster elements so reproduced are raster elements of the replica, reproduced as a motif, of the imprinted or visually structured surface of the object; and wherein the raster elements are larger than the digital pixels of the digital image.

14. The method according to claim 1, wherein the digital image created, made available or used, reproduces a replica of a raster formed from raster elements, of an imprinted or visually structured surface;

wherein the replica reproduces raster elements; and wherein each of the raster elements is composed of a plurality of printed dots of an imprint or a visual design of the surface.

15. The method according to claim 1, wherein the raster is constructed or reconstructed from raster elements having different sizes, brightness values or colors, with default values set for a boundary condition;

wherein the digital image or the replica contains a hidden information;

wherein input of the hidden information as a starting value, and an initial value or as a seed into a pseudo-random number generator allows calculation or generation of a predefined distribution of the size, brightness or color of raster elements for the raster to be constructed or to be reconstructed or for generation of a comparison raster having such a predefined distribution.

16. The method according to claim 1, wherein:

the raster is constructed or reconstructed from raster elements having different sizes, brightness values or colors, with default values set for boundary conditions;

wherein a raster base surface standing available for the raster, wherein the reproduced raster elements are distributed within the raster base surface, subdivided into a first partial surface region and a second partial surface region, wherein the first partial surface region or the second partial surface region is optionally cohesive or in multiple parts;

wherein in the first partial surface region, only the base cells or raster intersections having raster coordinates that fulfill the condition $x'+y'=2n+1$ are occupied by a raster element, whereas in the second partial surface region, only the base cells or raster intersections having raster coordinates that fulfill a condition $x'+y'=2n$ are occupied by a raster element or vice versa; and wherein the hidden information or a negative image of the hidden information is coded by the surface distribution or by the contour of the second partial surface region.

17. The method according to claim 1, wherein construction or reconstruction of the raster from the digital image or from the replica comprises:

determining hidden information from the digital image or the replica;

calculating a predefined distribution of different, predefined nominal parameter values for the size, brightness or color of raster elements using the hidden information and a pseudo-random number generator, and assigning the predefined distribution to the raster elements of the raster to be constructed or to be reconstructed; and determining the assigned statistical distributions of the actual sizes, brightness values or colors in accordance with the nominal parameter values so assigned.

18. The method according to claim 1, wherein the raster composed of raster elements having different sizes, brightness values or colors is constructed or reconstructed with default values set for a boundary condition that only half or some other proportion of the raster intersections or base cells of the raster to be constructed or to be reconstructed is occupied by raster elements; and by the information obtained from a digital template or in some other manner indicating the raster intersections or base cells of the raster to be constructed or to be reconstructed are occupied by raster elements or correspond to existing raster elements, statistical distributions of the actual sizes, brightness values or colors that are assigned to different parameter values are determined taking into consideration the raster intersections or base cells so occupied.

19. An object having a surface having an imprinted or configured raster in a design carrying a coded or decodable security feature;

wherein the raster is formed from a plurality of raster elements;

wherein the coded or decodable security feature comprises a first security feature and a second security feature;

wherein the first security feature is coded or able to be decoded by an arrangement, position or distribution of the plurality of raster elements in the raster;

wherein the second security feature is coded or able to be decoded by at least one parameter of the raster elements; and wherein the at least one parameter comprises a size of the raster elements, a brightness of the raster elements, or a color of the raster elements.

20. The object according to claim 19, wherein the second security feature is coded or able to be decoded in that the raster elements can be assigned, at least statistically, to first and second groups of differently structured raster elements;

wherein the first group of raster elements is configured in accordance with a first parameter value, and the second group of raster elements in configured in accordance with a second parameter value;

wherein the first and second parameter values correspond to two different sizes, two different brightness values or two different colors of the raster elements or two differently great nominal values for the raster elements.

21. The object according to claim 20, wherein the second security feature is coded by a predefined pseudo-random distribution of the first and second parameter values to the raster elements that form the raster, and the first and second parameter values or a difference between the first and second parameter values is selected in such a manner that at least with knowledge of the pseudo-random distribution of the first and second parameter values, a degree of similarity or a quality measurement for an at least statistical agreement of the raster with the pseudo-random distribution of the first and second parameter values can be determined.

22. The object according to claim 19, wherein the first security feature comprises a pseudo-random distribution or a deterministic distribution;

wherein the pseudo-random distribution or the deterministic distribution determines the base cells of the raster that are occupied by a corresponding raster element and the base cells that are not; and wherein the size, brightness or color of the raster elements according to the second security feature is varied in the base cells that are occupied by a corresponding raster element.

23. The object according to claim 19, wherein the first security feature is coded, for the base cells of the raster that are occupied by a corresponding raster element, as a pseudo-random distribution of decenterings or displacements of a corresponding raster element relative to a center point of a corresponding base cell; and wherein in the base cells occupied by the corresponding raster element, the size, brightness or color of the raster elements is varied in accordance with the second security feature.

24. The object according to claim 19, wherein the raster elements are individual printed dots, in each instance, wherein each dot cannot be further subdivided visually, or elementary surfaces of a printing technique used for processing of the surface or some other processing technique.

25. The object according to claim 19, wherein each of the raster elements are aggregates composed of a corresponding plurality of printed dots or of elementary surfaces of a printing technique used for processing the surface or some other processing technique.

26. The object according to claim 19, wherein the object is a label, a packaging or a housing, a container, a document, a tool part or machine part or another object to be checked with regard to authenticity or genuineness.

* * * * *